(12) United States Patent
Matsukawa et al.

(10) Patent No.: US 7,042,210 B2
(45) Date of Patent: May 9, 2006

(54) NON-CONTACT MAGNETIC POSITION SENSOR

(75) Inventors: Yasunori Matsukawa, Fukui (JP); Akira Matsuura, Osaka (JP); Shinjiro Ueda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/913,362

(22) PCT Filed: Dec. 14, 2000

(86) PCT No.: PCT/JP00/08860

§ 371 (c)(1),
(2), (4) Date: May 1, 2002

(87) PCT Pub. No.: WO01/44757

PCT Pub. Date: Jun. 21, 2001

(65) Prior Publication Data

US 2002/0135360 A1    Sep. 26, 2002

(30) Foreign Application Priority Data

Dec. 14, 1999  (JP) .................... 11-354310
Apr. 6, 2000   (JP) .................... 2000-104664
Sep. 14, 2000  (JP) .................... 2000-279669
Oct. 19, 2000  (JP) .................... 2000-319019

(51) Int. Cl.
*G01B 7/30* (2006.01)

(52) U.S. Cl. ............... 324/207.25; 324/207.2; 324/207.21

(58) Field of Classification Search ........... 324/207.2, 324/207.25, 207.21, 207.22, 207.23, 207.24, 324/260; 338/32 H, 32 R
See application file for complete search history.

(56) References Cited

U.S. PATENT DOCUMENTS

| 3,777,273 | A | | 12/1973 | Baba et al. | |
|---|---|---|---|---|---|
| 3,835,373 | A | | 9/1974 | Matula | |
| 4,665,362 | A | | 5/1987 | Abel et al. | |
| 4,806,813 | A | * | 2/1989 | Sumi et al. .................. | 310/254 |
| 5,444,369 | A | * | 8/1995 | Luetzow ................... | 324/207.2 |
| 5,581,180 | A | * | 12/1996 | Ito et al. ................. | 324/207.11 |
| 5,600,238 | A | | 2/1997 | Holloway et al. | |
| 6,304,078 | B1 | * | 10/2001 | Jarrard et al. ............ | 324/207.2 |
| 6,320,375 | B1 | * | 11/2001 | Cotton et al. ............... | 324/238 |
| 6,476,600 | B1 | * | 11/2002 | Kono et al. ............... | 324/207.2 |
| 6,559,637 | B1 | * | 5/2003 | Miyata et al. ........... | 324/207.2 |
| 2002/0089324 | A1 | * | 7/2002 | Miyata et al. ........... | 324/207.2 |

FOREIGN PATENT DOCUMENTS

DE          27 30 309         1/1979

(Continued)

OTHER PUBLICATIONS

Japanese language search report corresponding to application No. PCT/JP00/08860 dated Mar. 21, 2001.

(Continued)

*Primary Examiner*—Jay Patidar
(74) *Attorney, Agent, or Firm*—RatnerPresria

(57) ABSTRACT

A non-contact position sensor includes a plurality of magnets, at least one magnetic sensor element, and an object to be detected. The plurality of magnets form a magnetic circuit which includes a U-shaped first magnetic body, a U-shaped second magnetic body, and the plurality of magnets. The plurality of magnets are disposed between the two U-shaped magnetic bodies. The magnetic sensor element is held by the two U-shaped magnetic bodies.

15 Claims, 27 Drawing Sheets

FOREIGN PATENT DOCUMENTS

| | | |
|---|---|---|
| DE | 3634925 | 4/1988 |
| DE | 44 00 616 | 7/1995 |
| EP | 0 584 426 | 3/1994 |
| JP | 02208569 * | 8/1990 |
| JP | 5-264326 | 10/1993 |
| JP | 8-14615 | 2/1996 |
| JP | 10-122810 | 5/1998 |
| WO | 92/11510 | 7/1992 |

OTHER PUBLICATIONS

English translation of form PCT/ISA/210.
Search Report corresponding to application No. EP 00 98 1720 dated Jan. 21, 2003.

* cited by examiner

Rotation angle (degrees)

Normal direction

Reverse direction

NON-CONTACT MAGNETIC POSITION SENSOR

THIS APPLICATION IS A U.S. NATIONAL PHASE APPLICATION OF PCT INTERNATIONAL APPLICATION PCT/JP00/08860.

FIELD OF THE INVENTION

The present invention relates to a non-contact position sensor for detecting rotating angle or position of an object to be detected by a change in magnetism.

BACKGROUND OF THE INVENTION

A non-contact position sensor disclosed in Japanese Patent Laid-Open Publication, No. H02-240585 represents one of the kinds known in the past.

A non-contact position sensor of the prior art will be described hereinafter with reference to the accompanying drawings.

FIG. 34 is an exploded perspective view of the conventional non-contact position sensor, and FIG. 35 is a sectioned side view of the same non-contact position sensor.

The conventional non-contact position sensor comprises a first magnetic body 2 having a magnet 1 attached to it, and a second magnetic body 3 disposed to a position where one-side arm 3a confronts one-side arm 2a of the first magnetic body 2. A magnetic sensor element 4 is disposed to a side surface of the magnetic body 3 in a position to confront the magnet 1. A case 5 made of resin encases the magnet 1, the magnetic body 2, the magnetic body 3, and the magnetic sensor element 4 in it, and it also has a connector unit 6. An end of a connector terminal 7 is connected electrically with a lead terminal 8 wired from the magnetic sensor element 4. A cover 9 made of resin closes an opening of the case 5.

The conventional non-contact position sensor constructed as above operates in a manner which will be described next.

The above-described conventional non-contact position sensor has a magnetic flux shutter 10b inserted in a gap where the one-side arm 2a of the magnetic body 2 and the one-side arm 3a of the magnetic body 3 confront with each other, through another gap where the magnet 1 and the magnetic sensor element 4 confront with each other, as shown in FIG. 35. The magnetic flux shutter 10b is mounted to a rotary shaft of an object to be detected (not show in the figure), and it rotates conjunctly with a member 10a under measurement. As the magnetic flux shutter 10b moves in its circumferential direction, magnetic flux of the magnet 1 that reaches the magnetic sensor element 4 changes its density. This change of density of the magnetic flux is output as an output signal by the magnetic sensor element 4, and the output signal is then output to a computer or the like through the lead terminal 8 and the connector terminal 7, to detect a rotating angle of the member 10a under measurement.

In the above structure of the prior art, the magnetic flux shutter 10b is inserted in the gap between the one-side arm 2a of the magnetic body 2 and the one-side arm 3a of the magnetic body 3, and another gap between the magnet 1 and the magnetic sensor element 4. Therefore, a depth of insertion in the gap of the magnetic flux shutter 10b mounted to an end of the rotary shaft 10a changes substantially if the rotary shaft shifts off the center. In the above non-contact position sensor in which the magnetic flux to the magnetic sensor element 4 is turned on and off with the magnetic flux shutter 10b, there exists a problem that rotating angle of the rotary shaft is not detected accurately if the depth of insertion changes so greatly.

Moreover, because the conventional non-contact position sensor has the structure that the magnetic flux shutter 10b is attached in a vertical direction to the distal end of the rotary shaft, it is structurally complicated. Furthermore, in order to mount the non-contact position sensor accurately to the object to be detected, both of them need to be joined closely with respect to each other. There existed a problem, however, that the non-contact position sensor is not easily mountable to the close vicinity of the object to be detected due to the presence of the magnetic flux shutter.

In addition, there was also a problem with the foregoing structure that it exhibits hysteresis in the output characteristic, because of the structure in which the magnetic flux shutter 10b rotates while being inserted between the magnet 1 and the magnetic sensor element 4. That is, electromagnetic induction occurs in the magnetic flux shutter 10b by the lines of magnetic force of the magnet 1. As a result, the magnetic flux shutter 10b is magnetized with N-pole when the magnetic flux shutter 10b rotates in the normal direction, as shown in FIG. 36(a). On the contrary, the magnetic flux shutter 10b is magnetized with S-pole, as shown in FIG. 36(b), when the magnetic flux shutter 10b rotates in the reverse direction. For this reason, there occurs a variation in the lines of magnetic force that affects the magnetic sensor element 4 depending on rotating direction of the magnetic flux shutter 10b. Hence, the hysteresis occurs in the output characteristic, as the output varies between the normal direction and the reverse direction in which the member 10a under measurement rotates.

An object of the present invention is to solve the foregoing problems of the prior art, and to provide a non-contact position sensor that realizes a substantial reduction in amount of deviation of the rotary shaft of the object to be detected even if the rotary shaft of the object to be detected shifts off the center, so as to achieve accurate measurement of the rotating angle. The non-contact position sensor also facilitates mounting of it to the object to be detected with both of them joined closely together.

Another object of the invention is to provide a non-contact position sensor of an improved characteristic that obviates hysteresis in the output signals due to rotation in the normal direction and the reverse direction of the object being detected between.

In addition, still another object of the invention is to provide a non-contact position sensor having an outstanding linearity in the output.

DISCLOSURE OF THE INVENTION

A non-contact position sensor of this invention comprises a magnetic circuit composed of at least one magnet and a magnetically continuous magnetic body, at least one magnetic sensor element disposed to the magnetic circuit, and an object to be detected positioned in the magnetic circuit. The non-contact position sensor of this invention detects a change in output of the magnetic sensor element due to rotation or movement of the object to be detected disposed in the magnetic circuit, to measure a position of the object to be detected.

Furthermore, a non-contact position sensor of another exemplary embodiment of this invention comprises a magnetic body of magnetically closed circuit and two magnets disposed to an inside of the magnetic body of closed circuit. A magnetic sensor element is disposed to the inside of the magnetic body of closed circuit, and an object to be detected is positioned between the two magnets.

A non-contact position sensor of still another exemplary embodiment of this invention is provided with a magnetic circuit comprising a U-shaped first magnetic body, a U-shaped second magnetic body, and two magnets. The two magnets are disposed between the two U-shaped magnetic bodies arranged vertically, and a magnetic sensor element is disposed to a generally center portion between the two U-shaped magnetic bodies. An object to be detected is positioned either within a U-shaped space of the two U-shaped magnetic bodies or between the extended U-shaped magnetic bodies, for a linear movement.

THE BEST MODES FOR CARRYING OUT THE INVENTION

First Exemplary Embodiment

A non-contact position sensor of a first exemplary embodiment of this invention will be described hereinafter with reference to the accompanying drawings.

Figure 1:
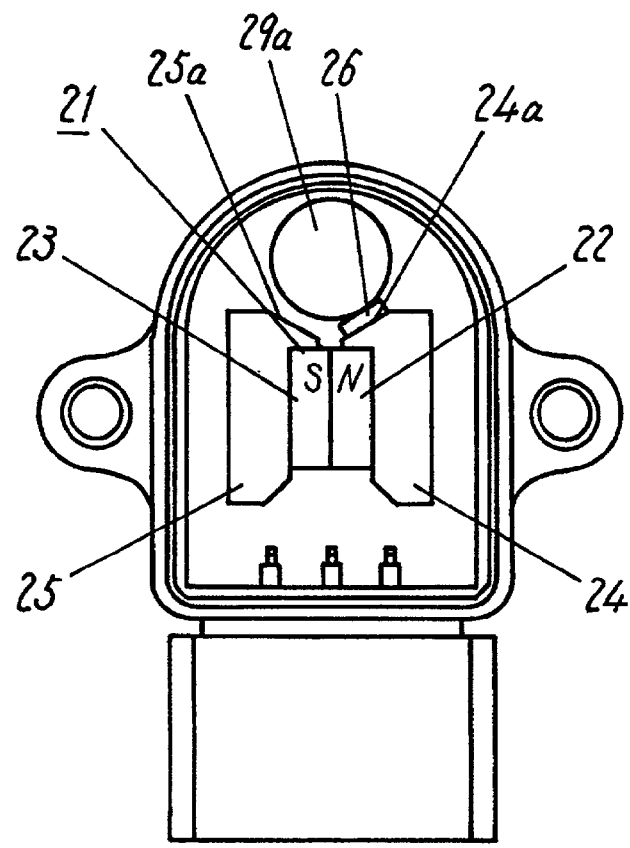
FIG. 1 is a plan view of a non-contact position sensor of a first exemplary embodiment of the present invention, with a cover and a circuit board removed.
Figure 2:
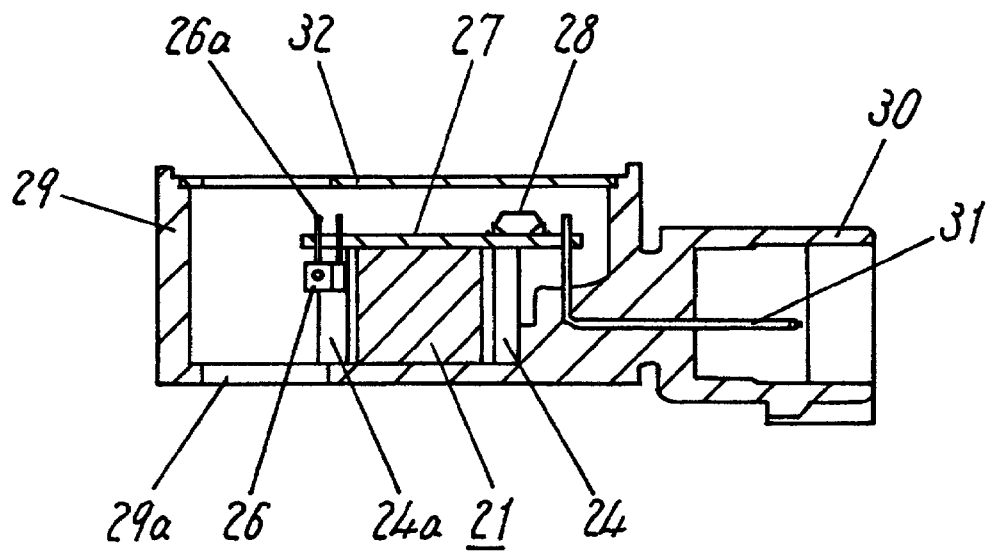
FIG. 2 is a sectioned side view of the non-contact type position sensor shown in FIG. 1.

FIG. 1 is a plan view of the non-contact position sensor in a state that a cover and a circuit board are removed in this first exemplary embodiment of the invention, and FIG. 2 is a sectioned side view of the same non-contact position sensor.

In FIG. 1 and FIG. 2, an L-shaped first magnetic body 24 is in contact to an N-pole 22 of a magnet 21. An L-shaped second magnetic body 25 is in contact to an S-pole 23 of the magnet 21. As shown, the magnet 21 is held at both sides between the first magnetic body 24 and the second magnetic body 25. A magnetic sensor element 26 is fixed to a tip end 24a of the L-shaped configuration of the first magnetic body 24 in a manner to face a tip end 25a of the L-shaped configuration of the second magnetic body 25. A hall element is an example that may be used as the magnetic sensor element 26. A magneto-resistance effect element (MR element) and a great magneto-resistance effect element (GMR and/or CMR element) may also be used as the magnetic sensor elements 26, besides the hall element. Although these magneto-resistance effect elements produce smaller output as compared to the hall element, they are superior in the resistance-to-temperature characteristic. A circuit board 27 is provided with a processing circuit 28 consisting of electronic components. The processing circuit 28 is electrically connected to the magnetic sensor element 26 through a lead terminal 26a, and converts an output signal produced by the magnetic sensor element 26 into an output voltage. A case 29 made of resin is provided with an aperture 29a, and end surfaces of the tip end 24a of the magnetic body 24 and the tip end 25a of the magnetic body 25 are in exposed position through an upper surface of the aperture 29a. The case 29 internally encases the magnet 21, the magnetic body 24, the magnetic body 25, and the circuit board 27. The case 29 has a connector unit 30 on its exterior surface, and the connector unit 30 is provided integrally with a connector terminal 31. The connector terminal 31 is electrically connected at its one end with the processing circuit 28, and the other end protrudes toward outside. A cover 32 made of resin closes an opening of the case 29.

Next, a method of assembling the non-contact position sensor constructed as above will be described.

First, the prefabricated magnet 21 is held between the magnetic body 24 and the magnetic body 25 by fixing the magnetic body 24 and the magnetic body 25 to an N-pole and an S-pole of the magnet 21 with adhesive or the like.

Next, after the magnetic sensor element 26 is bonded to the tip end 24a of the L-shaped configuration of the magnetic body 24, the magnetic body 24, the magnetic body 25, and the magnet 21 are placed in the case 29 having the prefabricated aperture 29a.

Then, the circuit board 27 completed in advance with the processing circuit 28 is placed on top of the magnetic body 24, the magnetic body 25, and the magnet 21 in the case 29.

Subsequently, the processing circuit 28 is connected electrically to the connector terminal 31 by soldering, after the lead terminal 26a of the magnetic sensor element 26 and the processing circuit 28 are electrically connected also by soldering.

Finally, the opening of the case 29 is closed with the cover 32.

The non-contact position sensor constructed and assembled as above operates in a manner, which will be described hereinafter with reference to the accompanying drawings.

Figure 3:
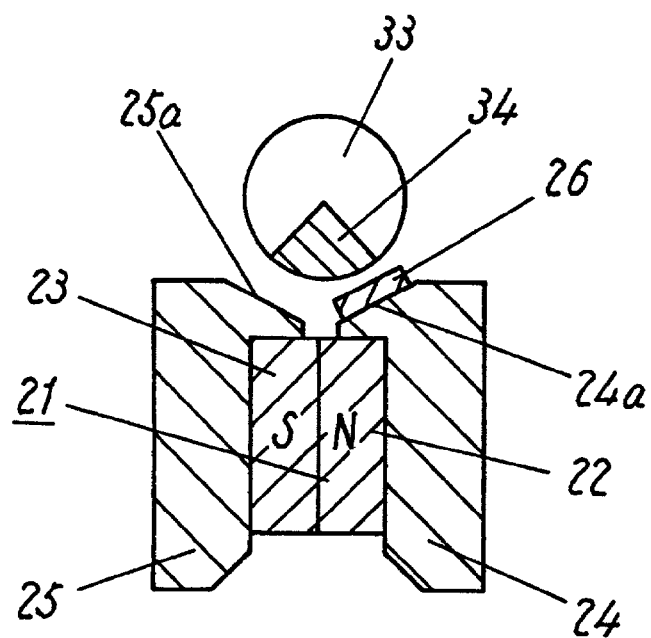
FIG. 3 is a sectional view of the non-contact position sensor of the first exemplary embodiment of this invention, depicting a state in which a rotary shaft of an object to be detected is inserted.

FIG. 3 is a sectional view depicting a state in that a rotary shaft of the object to be detected is inserted in the aperture of the non-contact position sensor of the first exemplary embodiment. As shown, the largest feature of the non-contact position sensor of this invention is to directly measure angle, location, and the like by directly inserting the object being detected.

In FIG. 3, the rotary shaft 33 is inserted in the aperture 29a of the case 29, and a sectorial portion 34 having a fan-shaped section provided at a distal end of the rotary shaft 33 is positioned between the tip end 24a of the magnetic body 24 and the tip end 25a of the magnetic body 25.

The sectoral portion 34 rotates as the rotary shaft 33 rotates. This rotation changes density of magnetic flux present in a gap formed between the tip end 24a and the tip end 25a.

Figures 4A, 4B:
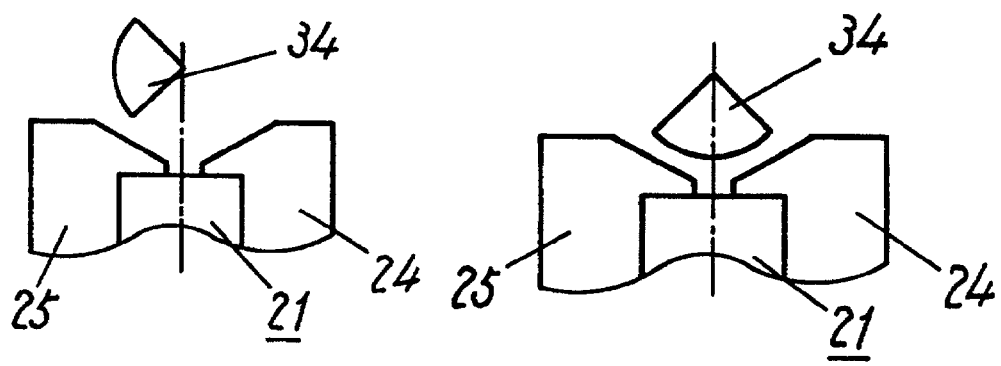
FIGS. 4(a) and (b) are expository illustrations showing operating states of the non-contact position sensor.
Figure 5:
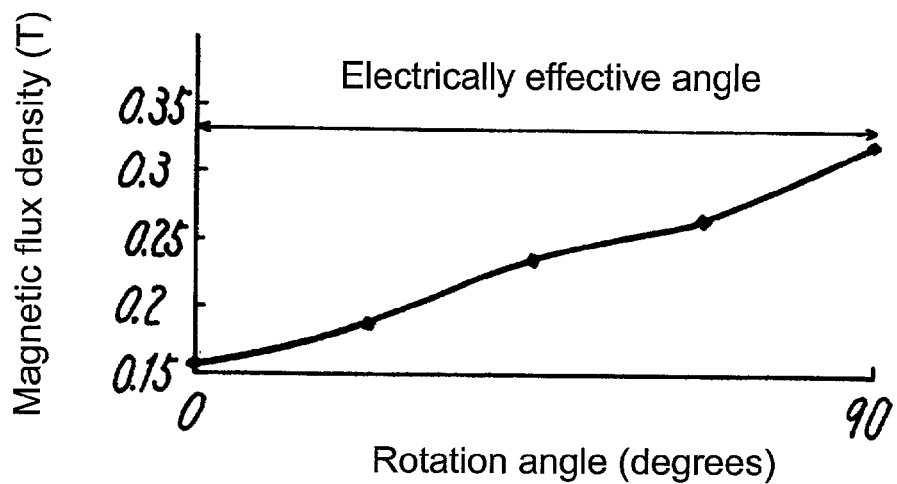
FIG. 5 is a characteristic chart showing a relation of magnetic flux density to rotating angle of the object to be detected.

That is, when a rotating angle of the sectorial portion 34 on the rotary shaft 33 shown in FIG. 4(a) is assumed to be 0 degree, the magnetic flux density is approx. 0.15 T, as shown in FIG. 5. However, the magnetic flux density becomes approx. 0.32 T, as shown in FIG. 5, when the rotating angle is 90 degrees as shown in FIG. 4(b).

In this exemplary embodiment, density of the magnetic flux between the tip end 24a and another tip end 25a increases as they become closer to the magnet 21, because the tip end 24a and the tip end 25a are slanted with respect to an N-S polar axis of the magnet. On the other hand, a speed of change in volume of the sectorial portion 34 occupying within the space between the tip end 24a and the tip end 25a decreases, as the rotating angle of the rotary shaft 33 increases. Accordingly, this can improve a linearity of the magnetic flux density that passes through the magnetic sensor element 26, responsive to the rotating angle of the rotary shaft 33 at the confronting side.

It detects a change in density of the magnetic flux as an output signal with the magnetic sensor element 26, converts it into an output voltage in the processing circuit 28, and outputs it through the connector terminal 31 to a computer, or the like, to measure a rotating angle of the rotary shaft 33.

In the first exemplary embodiment of this invention, as described, the structure is such that the rotary shaft 33 is positioned within the gap formed between the tip end 24a and the tip end 25a, to allow the rotary shaft 33 cause changes in density of the magnetic flux produced in the gap formed between the tip ends 24a and 25a in response to the rotating angle. This allows measurement of rotating angle of the rotary shaft 33 easily without providing complicated members such as a magnetic flux shutter and the like of the prior art.

Further, because the structure does not employ the magnetic flux shutter attached in a vertical direction to an end of the rotary shaft, as is the case of the conventional sensor, it realizes a substantial reduction in amount of deviation of the rotary shaft 33 even if the rotary shaft 33 shifts off the center. As the result, it can make accurate measurement of rotating angle of the rotary shaft 33. Also, because the non-contact position sensor is not provided with the complicated members such as the magnetic flux shutter of the prior art, it can be mounted easily to the object to be detected with both of them joined closely together.

In the first exemplary embodiment, in which a portion of the rotary shaft 33 located within the gap space is formed into a fan shape in cross section, density of the magnetic flux in the gap space formed between the tip ends 24a and 25a changes responsive to rotating angle of the rotary shaft 33. As a result, it has such an effect that the rotating angle of the rotary shaft 33 at the confronting side can be detected easily without requiring complicated members such as the magnetic flux shutters and the like of the prior art.

Moreover, a consideration is given now for a case that a large impact is applied to the non-contact position sensor in this first exemplary embodiment. In the non-contact position sensor of this invention, the magnet 21 is held between the magnetic body 24 and another magnetic body 25, because the tip end 24a and another tip end 25a are generally L-shaped respectively, and the magnetic body 24 and the magnetic body 25 are disposed in contact to the magnet 21. This can improve resistance to impact of the non-contact position sensor, since the magnetic body 24 and the magnetic body 25 are securely fixed to the magnet 21, even if a strong impact is impressed upon the non-contact position sensor.

In the foregoing descriptions, although the portion of the rotary shaft 33 located within the sensor is fan-shaped in cross section, like effect as stated in this first exemplary embodiment can be attained even if the cross section is formed into a semicircle shape.

In addition, what has been described above is an example in which one magnetic sensor element is used. However, more accurate measurement can be realized if two magnetic sensor elements are mounted, each on the tip end 24a and the tip end 25a of the magnetic bodies, and a difference of the outputs is detected between them.

Second Exemplary Embodiment

Referring now to the accompanying drawings a non-contact position sensor in second exemplary embodiment of this invention will be described hereinafter.

Figure 6:
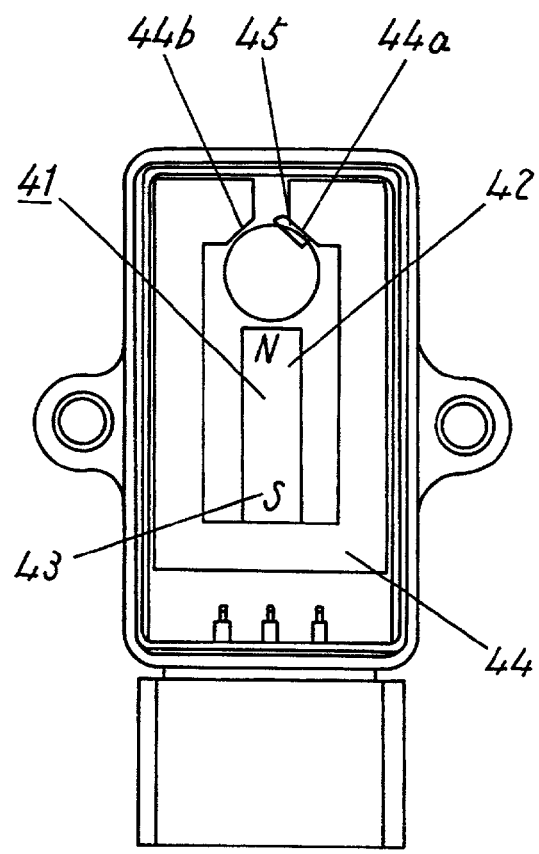
FIG. 6 is a plan view of a non-contact position sensor of a second exemplary embodiment of this invention.
Figure 7:
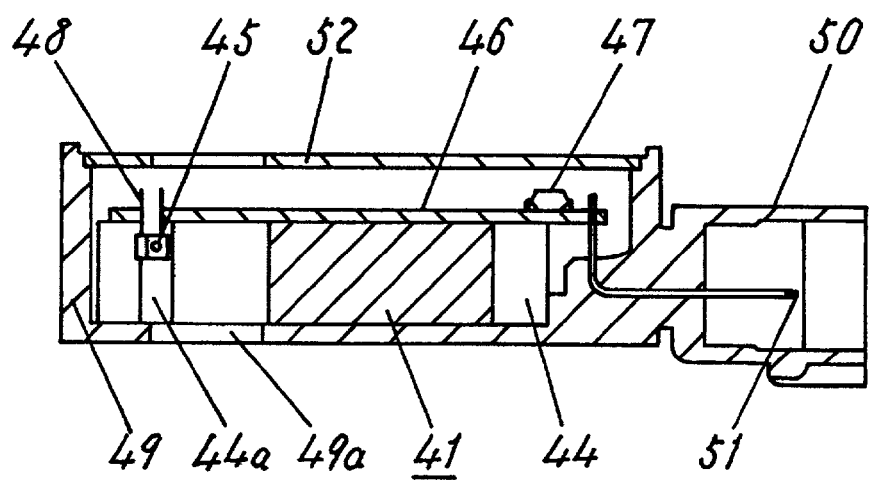
FIG. 7 is a sectioned side view of the non-contact position sensor of the second exemplary embodiment of this invention.

FIG. 6 is a plan view of the non-contact position sensor in a state that a cover and a circuit board are removed in this second exemplary embodiment of the invention, and FIG. 7 is a sectioned side view of the same non-contact position sensor.

In FIG. 6 and FIG. 7, a magnetic body 44 is so formed that it fixes an S-pole 43 of a magnet 41 at generally the center of it, and tip ends at both sides of the magnetic body 44 are L-shaped. A magnetic sensor element 45 is bonded to one tip end 44a of the magnetic body 44. This magnetic sensor element 45 detects density of magnetic flux produced in a space formed between an N-pole 42 of the magnet 41 and the tip end 44a. A circuit board 46 is provided with a processing circuit 47. The processing circuit 47 is electrically connected to the magnetic sensor element 45 through a lead terminal 48, and converts an output signal produced in the magnetic sensor element 45 into an output voltage. A case 49 made of resin internally encases the magnet 41 and the magnetic body 44, and it is provided with an aperture 49a in its bottom surface. The case 49 is provided with a connector unit 50, and an output voltage produced by the processing circuit 47 is output through a connector terminal 51 provided integrally with the case. A cover 52 made of resin closes an opening of the case 49.

A method of assembling the non-contact position sensor of this second exemplary embodiment constructed as above will be described next.

First, the prefabricated magnet 41 is fixed on its S-pole 43 to generally the center of the magnetic body 44 using adhesive or the like.

Next, after the magnetic sensor element 45 is bonded to the one tip end 44a of the magnetic body 44, the magnetic body 44 and the magnet 41 are placed in the case 49 having the prefabricated aperture 49a.

Then, the circuit board 46 completed in advance with the processing circuit 47 is placed on top of the magnetic body 44 and the magnet 41 in the case 49.

Subsequently, the processing circuit 47 is connected electrically to the connector terminal 51 by soldering, after the lead terminal 48 is electrically connected by soldering to the processing circuit 47.

Finally, the opening of the case 49 is closed with the cover 52.

The non-contact position sensor of the second exemplary embodiment constructed and assembled as above operates in a manner, which will be described hereinafter with reference to the accompanying drawings.

Figure 8:
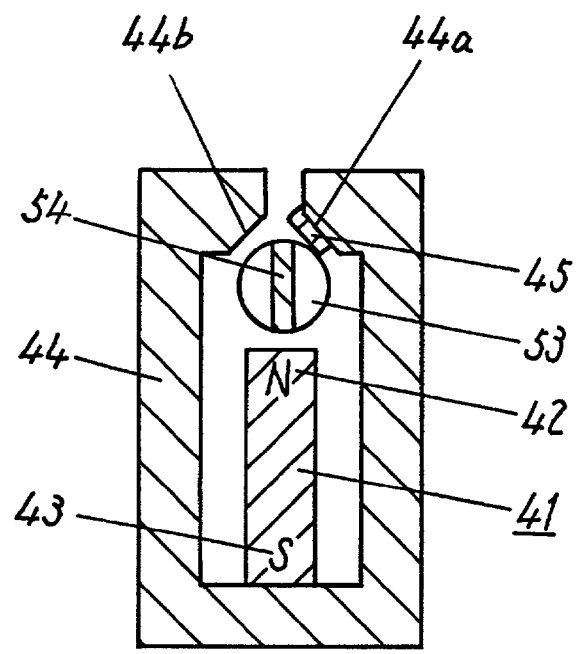
FIG. 8 is a sectional view of the non-contact position sensor of the second exemplary embodiment of this invention, depicting a state in which a rotary shaft of an object to be detected is inserted.

FIG. 8 is a sectional view depicting a state in that a rotary shaft 53 of an object to be detected is inserted into the aperture 49a in the non-contact position sensor of this second exemplary embodiment.

In FIG. 8, one end of the rotary shaft 53 is positioned within a space formed among one tip end 44a, the other tip end 44b, and the N-pole of the magnet 41. A portion of the rotary shaft 53 located within the sensor is I-shaped in cross section. In this exemplary embodiment, density of the magnetic flux produced in the space formed between the tip end 44a of the magnetic body 44 and the N-pole of the magnet 41 changes responsive to rotation of the I-shaped portion 54.

Figure 9A:
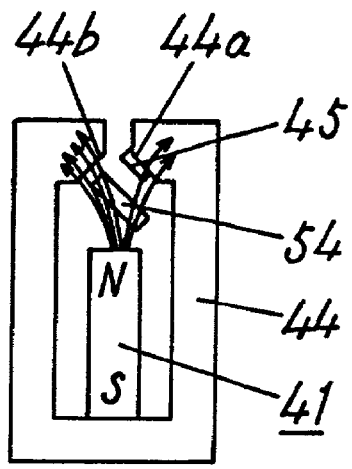
FIGS. 9(a), (b), and (c) are expository illustrations showing operating states of the non-contact position sensor.
Figure 9B:
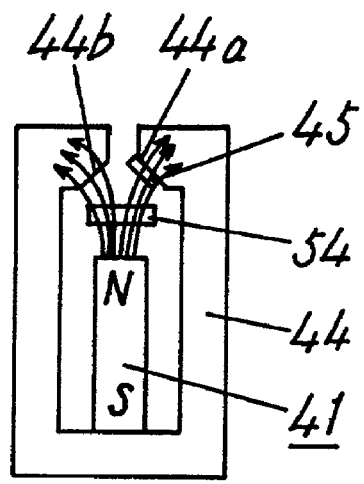
Figure 9C:
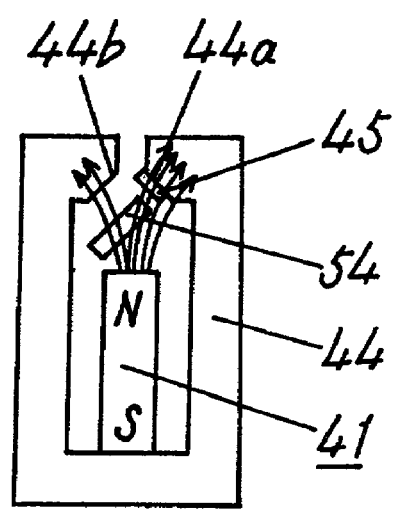
Figure 10:
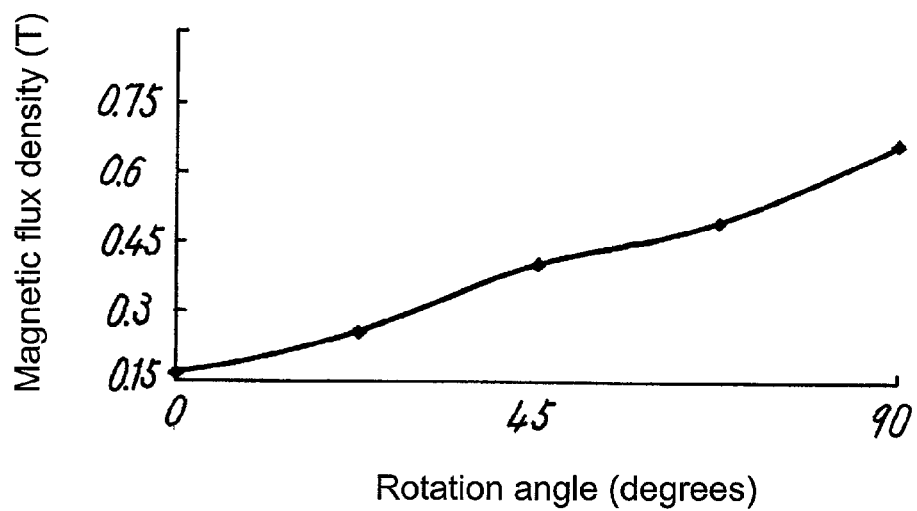
FIG. 10 is a characteristic chart showing a relation of magnetic flux density to rotating angle of the object to be detected.

That is, when rotating angle of the I-shaped portion 54 shown in FIG. 9(a) is assumed to be 0 degree, the magnetic flux density is approx. 0.15 T, as shown in FIG. 10, whereas the magnetic flux density becomes approx. 0.4 T, as shown in FIG. 10, when the rotating angle is 45 degrees as shown in FIG. 9(b). Further, the magnetic flux density becomes approx. 0.67 T, as shown in FIG. 10, at the rotating angle of 90 degrees as shown in FIG. 9(c).

In this second exemplary embodiment, a portion of the rotary shaft 53 located in the space formed between the tip end 44a and the N-poles of the magnet 41 is I-shaped. Because of the above, the rotary shaft 53 is not present in the vicinity of the tip end 44b when two longitudinal sides of the I-shaped portion 54 are located in the vicinity of the magnet 41 and the other tip end 44a. On the other hand, the rotary shaft 53 is not present in the vicinity of the other tip end 44a when the two longitudinal sides of the I-shaped portion 54 are located in the vicinity of the magnet 41 and the tip end 44b. Linearity of the magnetic flux density that passes through the magnetic sensor element 45 corresponding to rotating angle of the rotary shaft 53 can be thus improved, since magnetism of the tip end 44b becomes weak when magnetism of the other tip end 44a becomes intense.

Accordingly, it detects a change in density of the magnetic flux as an output signal with the magnetic sensor element 45, converts the output signal into an output voltage in the processing circuit 47, and outputs it through the connector terminal 51 to a computer, or the like, to measure a rotating angle of the rotary shaft 53 at the confronting side.

In the foregoing second exemplary embodiment, the structure is such that the rotary shaft 53 is positioned within the space formed among the one tip end 44a, the other tip end 44b and N-pole of the magnet 41, to allow the rotary shaft 53 cause changes in density of the magnetic flux produced in the space in response to the rotating angle.

Therefore, like advantageous effects as those of the above-described first exemplary embodiment are realized as opposed to the similar type sensor of the prior art.

Third Exemplary Embodiment

Referring to the accompanying drawings a non-contact position sensor in third exemplary embodiment of this invention will be described hereinafter.

Figure 11:
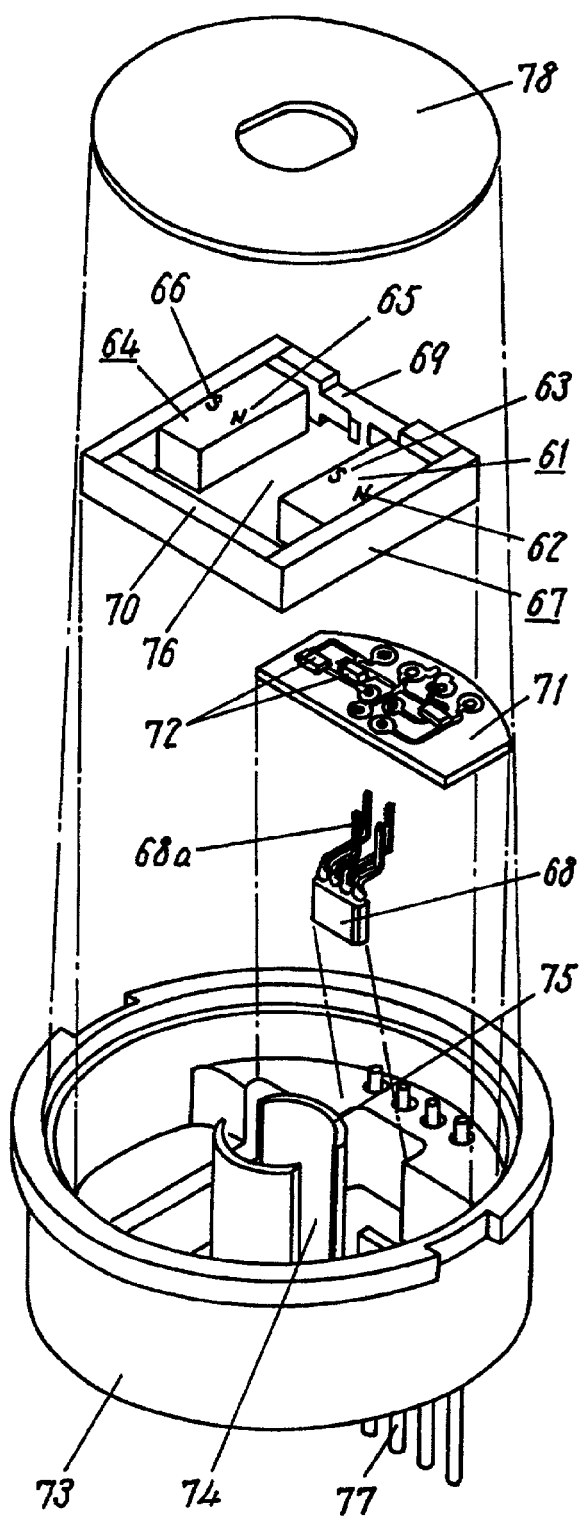
FIG. 11 is an exploded perspective view of a non-contact position sensor of a third exemplary embodiment of this invention.
Figure 12:
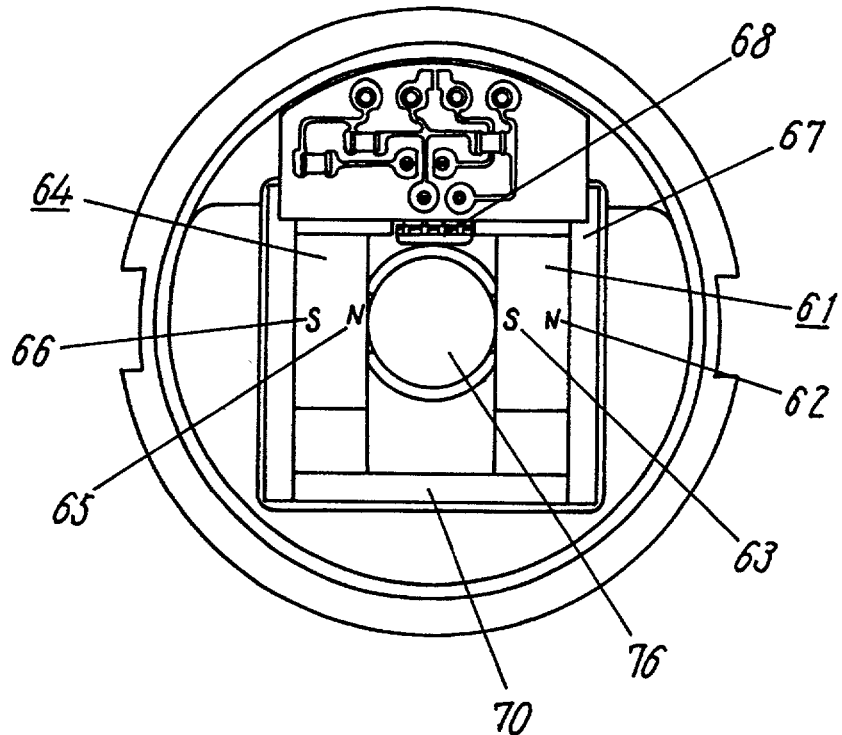
FIG. 12 is a plan view of the non-contact position sensor of the third exemplary embodiment of this invention.
Figure 13:
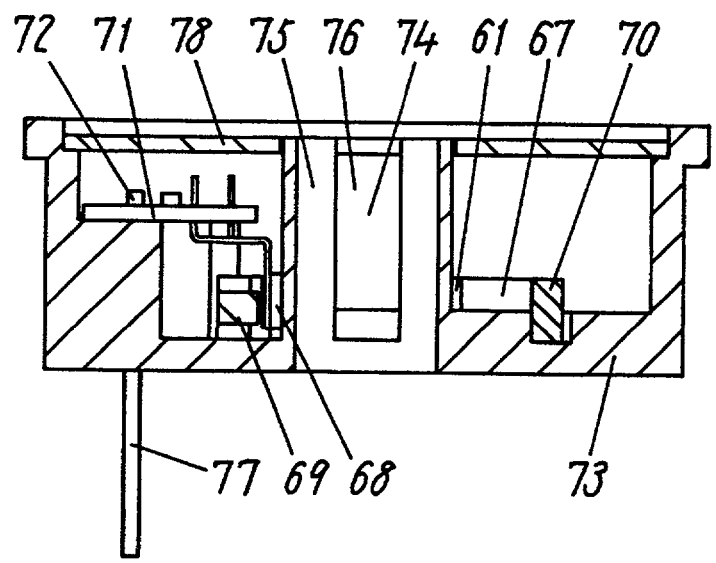
FIG. 13 is a sectioned side view of the non-contact position sensor of the third exemplary embodiment of this invention.

FIG. 11 is an exploded perspective view of a non-contact position sensor of the third exemplary embodiment of this invention, FIG. 12 is a plan view of the non-contact position sensor in a state that a cover is removed, and FIG. 13 is a sectioned side view of the same non-contact position sensor.

In FIG. 11 through FIG. 13, a first magnet 61 is fixed on its N-pole 62 to an inner surface of an one-side arm of a U-shaped magnetic body 67, in a manner to face a second magnet 64. The second magnet 64 is fixed on its S-pole 66 to an inner surface of an another-side arm of the magnetic body 67. In this exemplary embodiment, the first magnet 61 disposed to the one-side arm of the magnetic body 67 and the second magnet 64 disposed to the another-side arm of the magnetic body 67 are in a perpendicular arrangement with respect to lines of magnetic force, because the magnetic body 67 is U-shaped. Since this increases the lines of magnetic force that flow in the magnetic circuit, it provides for an effect of improving output sensitivity of the non-contact position sensor.

The U shape described in this invention does not necessarily mean to be strictly the character "U", but it includes such shapes as a quadrangle having an open side, and a shape of character "C".

A magnetic sensor element 68 is disposed to an inside surface at an intermediate portion 69 of the magnetic body 67. In this exemplary embodiment, a thickness of a part of the intermediate portion 69 of the magnetic body 67 where the magnetic sensor element 68 is disposed is reduced as compared to thicknesses of the other parts where the magnetic sensor element 68 is not located. Therefore, the lines of magnetic force that flow in the magnetic body 67 concentrate in the part where the magnetic sensor element 68 is disposed, and thereby a number of the lines of magnetic force that pass through the magnetic sensor element 68 further increases. Thus, this provides for the effect of further improving the output sensitivity of the non-contact position of this exemplary embodiment.

Moreover, the one-side arm and the another-side arm of the magnetic body 67 are connected to be magnetically continuous with a reinforcing magnetic body 70. Provision of the reinforcing magnetic body 70 connecting the one-side arm to the another-side arm of the magnetic body 67 in the above manner can construct the magnetic circuit such that it absorbs lines of magnetic force that otherwise leak outside from a space between the one-side arm and the another-side arm of the magnetic body 67. This increases amount of the lines of magnetic force that pass the magnetic sensor element 68, and gives an effect of further improving the output sensitivity of the non-contact position sensor.

A circuit board 71 is provided on its upper surface with a processing circuit consisting of electronic components 72 such as capacitors. The processing circuit is electrically connected with the magnetic sensor element 68 through a lead terminal 68a, and it converts an output signal produced by the magnetic sensor element 68 into an output voltage. A case 73 made of resin is provided with a cylindrical portion 75 having a slit 74 cut upwardly from a bottom surface, and also a space 76 within the cylindrical portion 75. The S-pole 63 of the magnet 61, the N-pole 65 of the magnet 64 and the magnetic sensor element 68 are disposed adjacent to the space 76.

The case 73 is also provided with a connector terminal 77 on its bottom exterior surface in a manner to project downward, and one end of the connector terminal 77 is in electrical connection with the circuit board. A cover 78 made of resin covers an opening of the case 73.

A method of assembling the non-contact position sensor of this third exemplary embodiment constructed as above will be described next.

First, the prefabricated magnet 61 is fixed on its N-pole 62 to the inner surface of the one-side arm of the magnetic body 67 with adhesive or the like, and the magnet 64 is fixed thereafter on its S-pole 66 to the inner surface of the another-side arm of the magnetic body 67 in the same manner with adhesive or the like.

Next, a distal end of the one-side arm and another distal end of the another-side arm of the magnetic body 67 are connected with the reinforcing magnetic body 70 using adhesive.

Then, after the magnetic sensor element 68 and the electronic components 72 are mounted on the circuit board 71, the magnetic sensor element 68 and the electronic components 72 are electrically connected to the circuit board 71 by soldering.

Subsequently, the magnet 61, another magnet 64, the magnetic body 67, the magnetic sensor element 68, the reinforcing magnetic body 70, and the circuit board 71 are placed inside the case 73 integrally formed in advance with the connector terminal 77. Finally, the opening of the case 73 is closed with the cover 78.

The non-contact position sensor of the third exemplary embodiment constructed and assembled as above operates in a manner, which will be described hereinafter with reference to the accompanying drawings.

Figure 14:
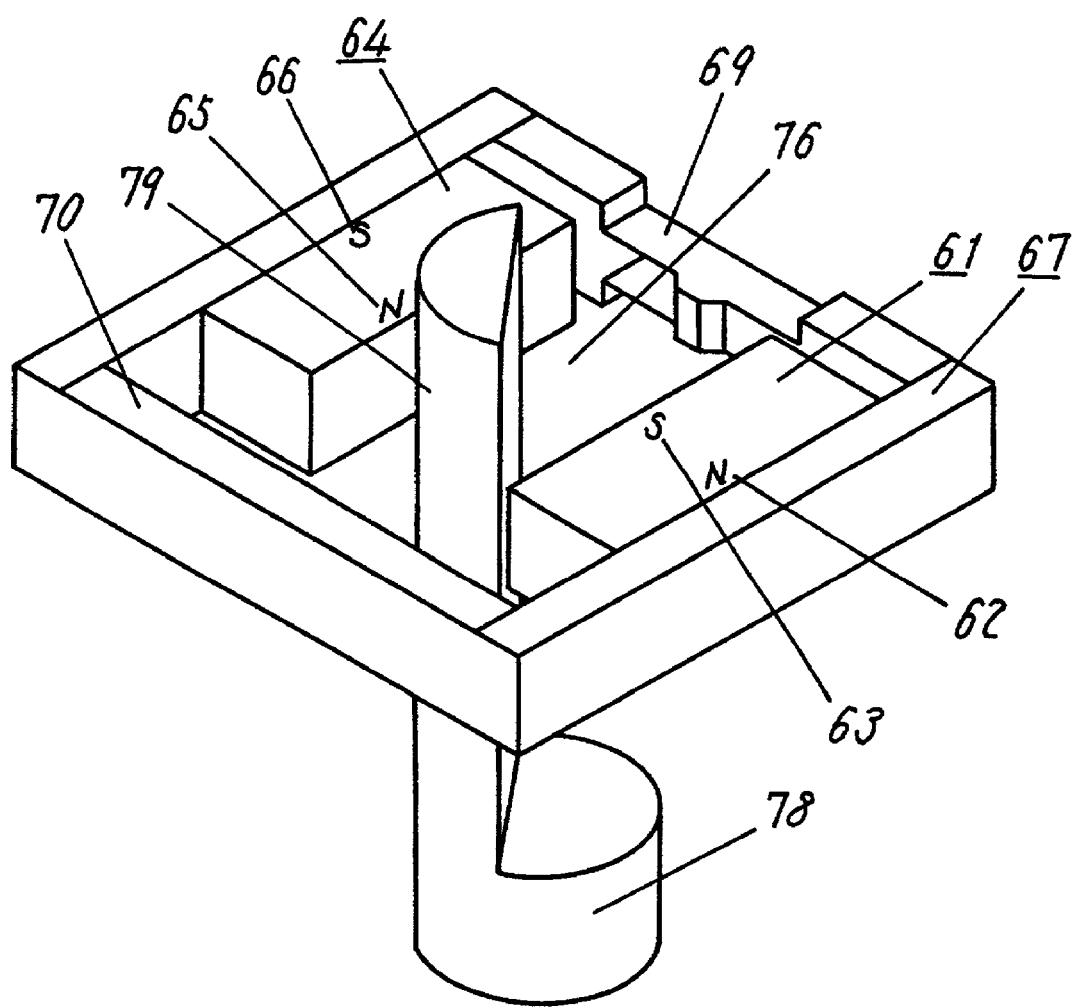
FIG. 14 is a perspective view of the non-contact position sensor of the third exemplary embodiment of this invention, depicting a state in which a rotary shaft of an object to be detected is inserted.

FIG. 14 is a perspective view depicting a state in that a rotary shaft of an object to be detected is inserted into the space in the non-contact position sensor of this third exemplary embodiment.

In FIG. 14, the rotary shaft 78 of the object to be detected is inserted into the cylindrical portion 75 of the case 73. The rotary shaft 78 is provided at its distal end with a semicircle portion 79 having a semicircular shape in cross section. The semicircle portion 79 is positioned within the space 76 formed among the magnetic sensor element 68, the magnet 61, and another magnet 64. In this condition, a lateral distance between the magnet 61 and the magnet 64 is generally matched to a diameter of the rotary shaft 78, in this exemplary embodiment. Since this avoids any of the lines of magnetic force from passing though a space not occupied by the rotary shaft 78 between the magnet 61 and the magnet 64, thereby providing for an effect of improving an output characteristic of the non-contact position sensor.

In this exemplary embodiment, density of the magnetic flux produced in the space 76 changes when the rotary shaft 78 rotates, as the semicircle portion 79 of the rotary shaft 78 also rotates.

Figure 15:
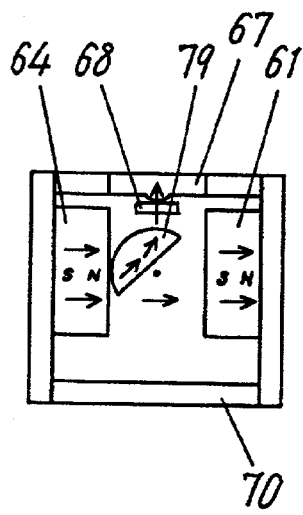
FIGS. 15(a), (b), and (c) are expository illustrations showing operating states of the non-contact position sensor.
Figure 15:
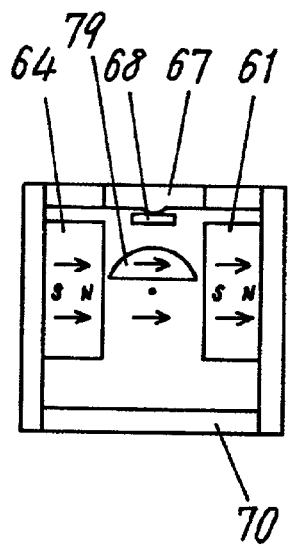
Figure 15:
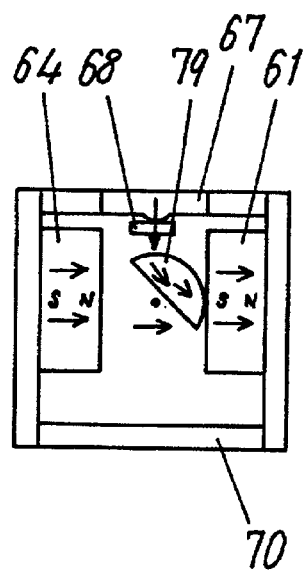
Figure 16:
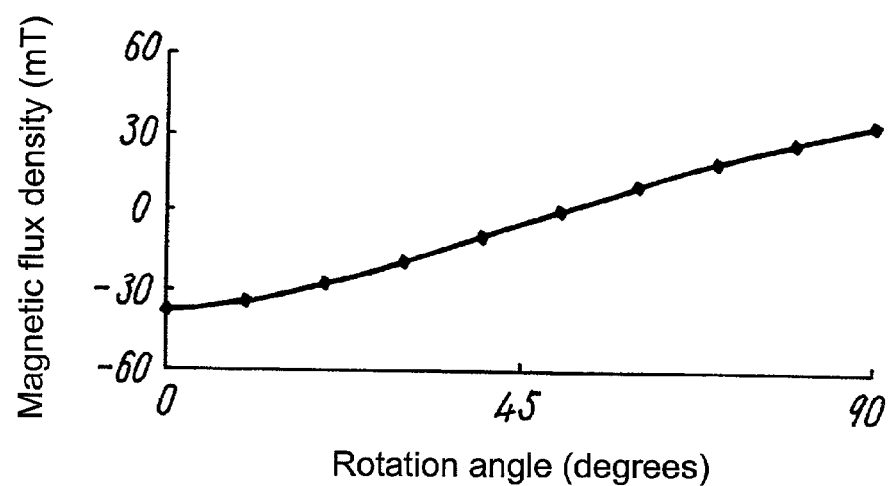
FIG. 16 is a characteristic chart showing a relation of magnetic flux density to rotating angle of the object to be detected.

That is, when rotating angle of the semicircle portion 79 of the rotary shaft 78 shown in FIG. 15(a) is assumed to be 0 degree, the magnetic flux density is approx. −40 T, as shown in FIG. 16, whereas the magnetic flux density becomes approx. 0 T when the rotating angle is 45 degrees as shown in FIG. 15(b), and the magnetic flux density further becomes approx. 30 T at the rotating angle of 90 degrees as shown in FIG. 15(c).

When rotating angle of the semicircular portion 79 is 0 degree, the magnetic force flows to the magnetic sensor element 68 from a side of the rotary shaft 78, as shown in FIG. 15(a), because the space from the magnet 64 to the magnetic sensor element 68 via the semicircular portion 79 becomes small. However, the magnetic force comes to a state of not flowing to the magnetic sensor element 68 when the semicircular portion 79 is at the rotating angle of 45 degrees as shown in FIG. 15(b), because the space from the magnet 64 to the first magnet 61 via the semicircular portion 79 becomes small. Then, the magnetic force flows from a side of the magnetic sensor element 68 to the side of the rotary shaft 78 when the rotating angle of the semicircular portion 79 of the rotary shaft 78 is at 90 degrees as shown in FIG. 15(c), since the space to the magnet 61 from the magnetic sensor element 68 via the semicircular portion 79 becomes small.

Thus, it detects a change in density of the magnetic flux as an output signal with the magnetic sensor element 45, converts the output signal into an output voltage with the electronic components 72 on the circuit board 71, and outputs it through the connector terminal 77 to a computer, or the like, to measure the rotating angle of the rotary shaft 78.

In the foregoing third exemplary embodiment, the structure is such that the rotary shaft 78 is positioned within the space 76 formed among the magnetic sensor element 68, the magnet 61, and the magnet 64, to allow the rotary shaft 78 cause changes in density of the magnetic flux produced in the space 76 in response to the rotating angle. Therefore, like advantageous effects as those of the above-described first exemplary embodiment are realized as opposed to the similar type sensor of the prior art.

In the foregoing descriptions, although the portion of the rotary shaft 78 located within the space 76 is semi-circularly shaped in cross section, like effects can be attained even if the cross-section is formed into a fan shape.

Fourth Exemplary Embodiment

Referring to the accompanying drawings a non-contact position sensor in fourth exemplary embodiment of this invention will be described hereinafter.

Figure 17:
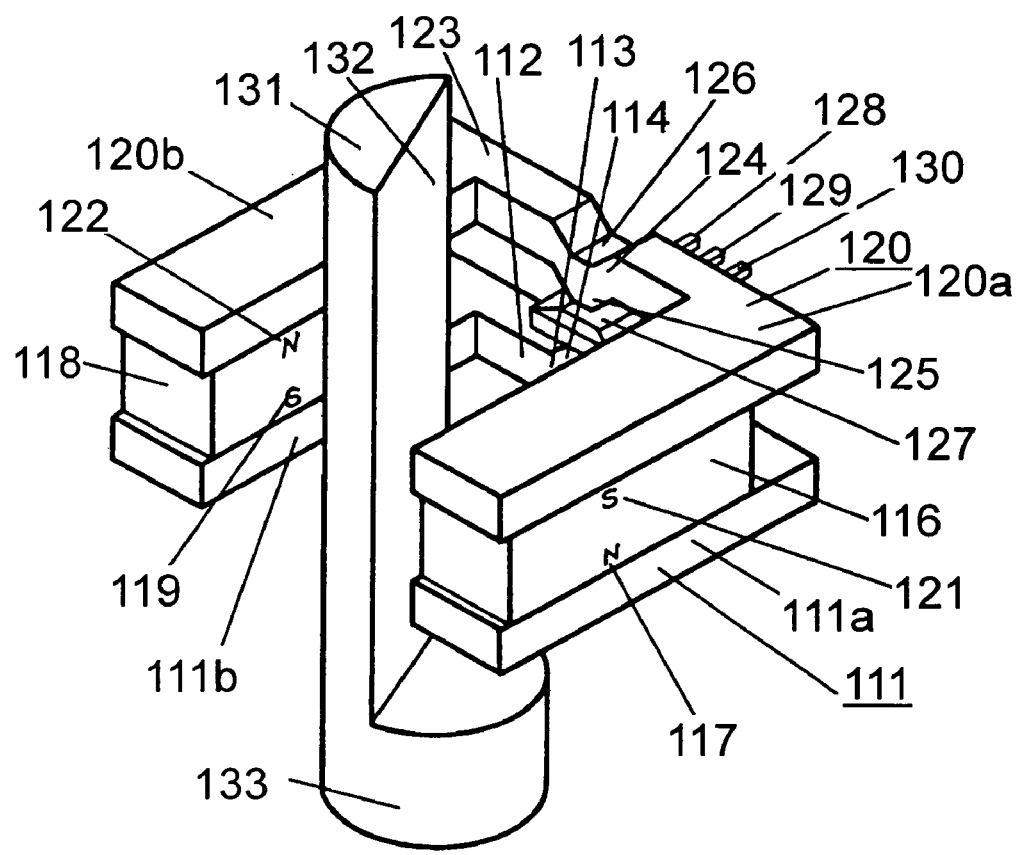
FIG. 17 is a perspective view of a non-contact position sensor of a fourth exemplary embodiment of this invention, depicting a state in which an object to be detected is inserted therethrough.

FIG. 17 is a perspective view depicting a state in which an object to be detected is inserted into a non-contact position sensor of the fourth exemplary embodiment of this invention.

In FIG. 17, a first magnetic body 111 having a shape of letter U is provided with a first magnetic-detecting portion 113 on an upper surface at an intermediate portion 112, and a first projecting portion 114 projecting upward on this first magnetic-detecting portion. A first magnet 116 having a principal ingredient of SmCo, for instance, is fixed on its N-pole 117 to an upper surface of one-side arm 111a of the magnetic body 111, and a second magnet 118 having a principal ingredient of SmCo is fixed on its S-pole 119 to an another-side arm 111b of the magnetic body 111. A second magnetic body 120 having a shape of letter U has an S-pole 121 of the magnet 116 fixed to a lower surface of its one-side arm 120a, and an N-pole 122 of the magnet 118 fixed to a lower surface of its other side 120b. The second magnetic body 120 is also provided on a lower surface at an intermediate portion 123 with a second magnetic-detecting portion 124 in a manner to confront the first magnetic-detecting portion 113. Further, the second magnetic-detecting portion 124 is provided with a second projecting portion 125 projecting downward, and a recessed portion 126 on the other side of the projecting portion 125. Similarly, there is another recessed portion (not show in the figure) provided on the other side of the first projecting portion 114. A magnetic sensor element 127 is disposed between the first magnetic-detecting portion 113 and the second magnetic-detecting portion 124.

In the present exemplary embodiment, the magnetic-detecting portion 113 is provided with the upwardly projecting first projecting portion 114, and the second magnetic-detecting portion 124 is provided with the downwardly projecting second projecting portion 125. This allows lines of magnetic force originating from the magnet 116 as well as the magnet 118 to concentrate into the projecting portion 114 and the projecting portion 125, thereby increasing an output sensitivity of the magnetic sensor element 127, and consequently improving output characteristic of the non-contact position sensor.

Further, the magnetic sensor element 127 is provided with a power supply terminal 128, an output terminal 129 and a GND terminal 130. The power supply terminal 128 is electrically connected to a power supply (not show in the figure), the GND terminal 130 is electrically connected to the ground (not show in the figure), and the output terminal 129 is electrically connected to a computer, or the like.

The non-contact position sensor of the fourth exemplary embodiment constructed as above is assembled in a manner, which is described next.

First, the first projecting portion 114 and the recessed portion (not show in the figure) are formed with drawing process in the intermediate portion of the first magnetic body 111, which is prefabricated in the shape of letter U.

Next, adhesive is applied to an upper surface of the one-side arm 111a and a lower surface of the another-side arm 111b of the magnetic body 111, the magnet 116 is fixed on its N-pole 117 to the upper surface of the one-side arm 111a, and the magnet 118 is fixed thereafter on its S-pole 119 to the another-side arm 111b.

Subsequently, the second projecting portion 125 and the second recessed portion 126 are formed in the intermediate portion 123 of the second magnetic body 120 prefabricated in the shape of letter U.

In this exemplary embodiment, since the projecting portion 125 is formed with drawing process and the recessed portion 126 on the another-side arm of the projecting portion 125, there is not lines of magnetic force originating from the magnet 116 and the magnet 118 to pass through the recessed portion 126, and thereby the lines of the magnetic force concentrate in the second magnetic-detecting portion 124. This increases lines of the magnetic force that pass through the magnetic sensor element 127, increases sensitivity of an output delivered from the output terminal 129 of the magnetic sensor element 127, and improves an output characteristic of the non-contact portion sensor.

Next, the one-side arm 120a of the magnetic body 120 is fixed with the adhesive to the S-pole 121 of the magnet 116, and the another-side arm 120b also with adhesive to the N-pole 122 of the magnet 118.

Finally, the magnetic sensor element 127 integrally formed in advance with the power supply terminal 128, the output terminal 129, and the GND terminal 130 is mounted with another member (not show in the figure) so as to be located in a position between the magnetic-detecting portion 113 of the magnetic body 111 and the magnetic-detecting portion 124 of the magnetic body 120.

The non-contact position sensor of the fourth exemplary embodiment constructed and assembled as above operates in a manner, which will be described next with reference to the accompanying drawings.

First, a power supply is connected to the power supply terminal 128 of the magnetic sensor element 127, and the GND terminal 130 to the ground. Then, after an object 133 to be detected, which comprises a rotary shaft having a semicircular portion 131 and a cutout portion 132, is inserted into an interior side of the magnetic body 111 and the magnetic body 120, and the object 133 to be detected is turned.

Figure 18:
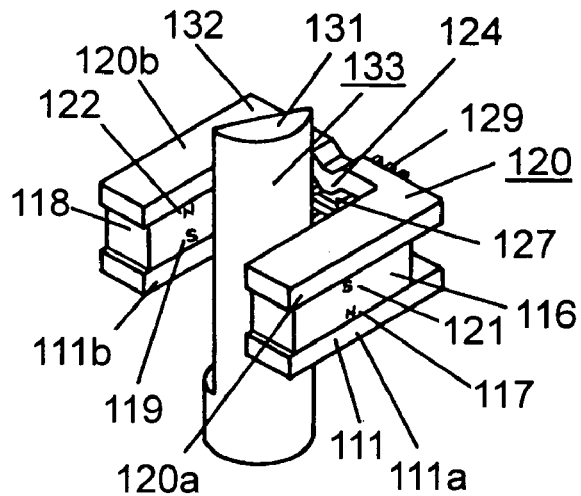
FIG. 18 are expository illustrations showing operating states of the non-contact position sensor.
Figure 18:
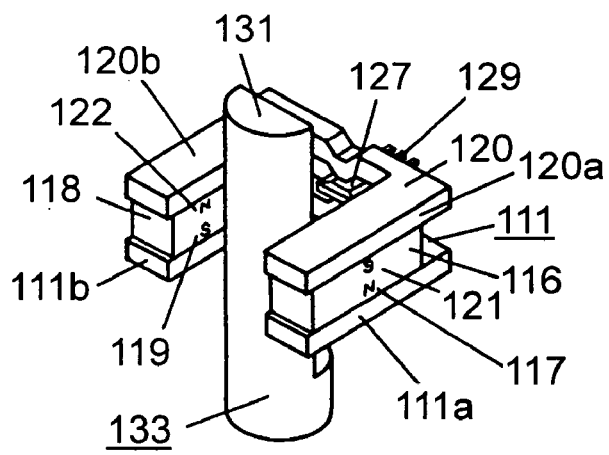
Figure 18:
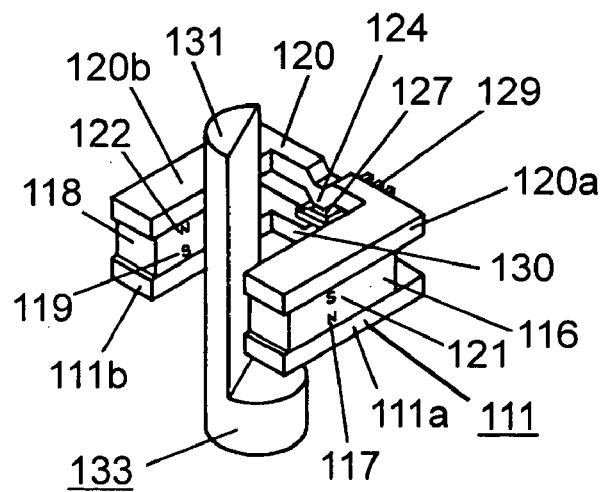

An arrangement is such that when rotating angle of the object 133 to be detected is 10 degrees, the semicircular portion 131 of the object 133 to be detected locates in the vicinity of the magnet 116, and the cutout portion 132 locates in the vicinity of the magnet 118, as shown in FIG. 18(*a*). In this case, lines of magnetic force originating from the N-pole 117 of the magnet 116 returns to the S-pole 121 of the magnet 116 from the one-side arm 111a of the magnetic body 111 through the semicircular portion 131 of the object 133 to be detected and the one-side arm 120a of the magnetic body 120. On the other hand, lines of magnetic force originating from the N-pole 122 of the magnet 118 reaches the first magnetic-detecting portion 113 of the magnetic body 111 after passing through the magnetic sensor element 127 from the second magnetic-detecting portion 124 via the another-side arm 120b of the magnetic body 120, and return to the S-pole 119 of the magnet 118 from the another-side arm 111b of the magnetic body 111. At this time, an output voltage at the output terminal 129 of the magnetic sensor element 27 becomes approx. 0.7V, as shown in FIG. 19.

When rotating angle of the object 133 being detected is 50 degrees, the semicircular portion 131 locates in such an orientation that is perpendicular to both the magnet 116 and the magnet 118, as shown in FIG. 18(b), and the lines of magnetic force hardly flow into the object 133 being detected. At this moment, the lines of magnetic force originating from the N-pole 117 of the magnet 116 loop in a way that they are introduced from the one-side arm 111a to the another-side arm 111b of the magnetic body 111, pass through the S-pole 119 and the N-pole 122 of the magnet 118, proceed from the another-side arm 120b to the one-side arm 120a of the magnetic body 120, and return to the S-pole 121 of the magnet 116. As a result, the lines of magnetic force do not pass through the magnetic sensor element 127. At this time, output voltage at the output terminal 129 of the magnetic sensor element 127 becomes approx. 2.5V, as shown in FIG. 19.

Figure 19:
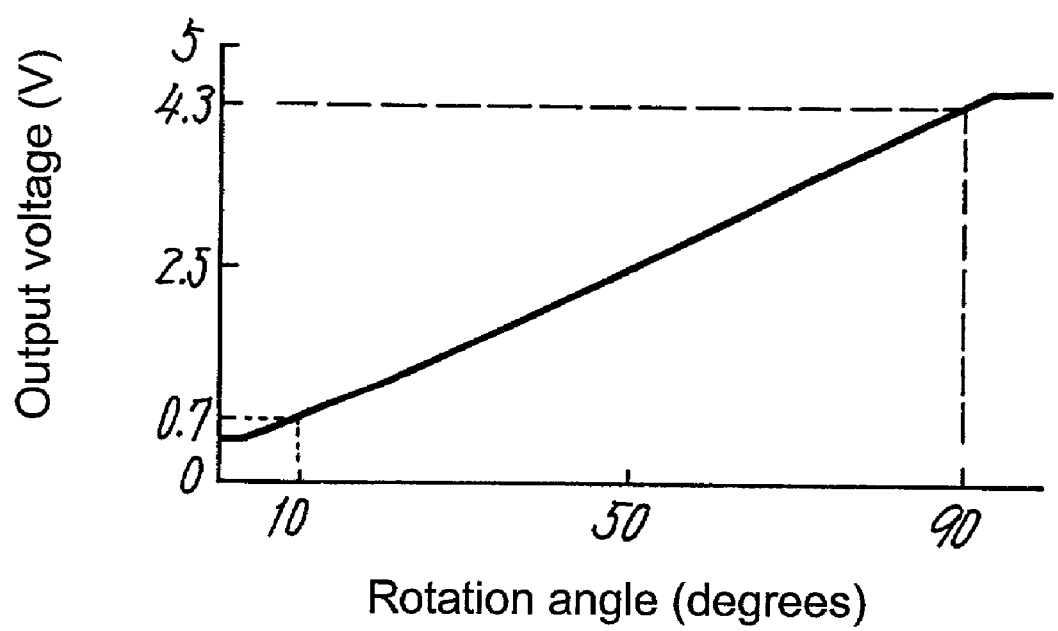
FIG. 19 is a characteristic chart showing a relation of output voltage to rotating angle of the object to be detected.

Furthermore, when rotating angle of the object 133 being detected is 90 degrees, the object 133 being detected locates in the vicinity of the magnet 118, after rotating into that position, as shown in FIG. 19.

At this moment, the lines of magnetic force originating from the N-pole 122 of the magnet 118 return to the S-pole 119 of the magnet 118 via the another-side arm 120b of the magnetic body 120 and further through the semicircular portion 131 and the another-side arm 111b of the magnetic body 111. On the other hand, the lines of magnetic force originating from the N-pole 117 of the magnet 116 pass through the one-side arm 111a and the magnetic-detecting portion 113 of the magnetic body 111, and into the magnetic sensor element 127 upwardly from its lower side, and return to the S-pole 121 of the magnet 116 through the magnetic-detecting portion 124 and the one-side arm 120a of the magnetic body 120. At this time, output voltage at the output terminal 129 becomes approx. 4.3V, as shown in FIG. 19.

In other words, the lines of the magnetic force pass the magnetic sensor element 127 downwardly from its upper side in the state that the semicircular portion 131 locates in the vicinity of the magnet 116, whereas the lines of magnetic force pass the magnetic sensor element 127 upwardly from its lower side in the state that the semicircular portion 131 locates in the vicinity of the magnet 118. Therefore, as the object 133 being detected rotates, output signal shown in FIG. 19 is output in response to the rotating angle, and the output signal is input to a computer or the like (not show in the figure) to measure the rotating angle of the object 133 being detected.

Here, consideration is made for a case in which magnetic force is generated in the object 133 being detected by electromagnetic induction when the object 133 being detected passes by the magnet 116 and the magnet 118.

In the non-contact position sensor of this exemplary embodiment, the magnetic sensor element 127 is disposed between the first magnetic-detecting portion 113 and the second magnetic-detecting portion 124. Therefore, a flow of the lines of magnetic force originating from the N-pole 117 of the magnet 116 and returning to the S-pole 121 of the magnet 116 through the magnetic body 111, the S-pole 119 of the magnet 118, the N-pole 122 of the magnet 118 and the magnetic body 120 is independent from another flow of the lines of magnetic force acting on the object 133 being detected. Consequently, the magnetic sensor element 127 never detects directly any influence caused by magnetization of the object 133 being detected attributable to electromagnetic induction of the magnet 116 and the magnet 118. Therefore, there can be avoided a phenomenon of causing hysteresis in output signals due to rotation of the object 133 to be detected in the normal direction and the reverse direction, as has occurred in similar sensors of the prior art. According to this exemplary embodiment, as has been described, there can be provided the non-contact position sensor with improved characteristics that had not been realized before.

Besides, the magnet 116 and the second magnet 118 are in position to face each other in generally parallel, because the magnetic body 111 and the magnetic body 120 are U-shaped in this exemplary embodiment. Therefore, when the semicircular portion 131 of the object 133 to be detected comes closest to the magnet 116, the lines of magnetic force originating from the magnet 118 are not likely to pass the object 133 to be detected, because the cutout portion 132 comes to face toward the magnet 118. This allows most of the lines of magnetic force to pass through the magnetic sensor element 127, thereby improving sensitivity of the output produced from the magnetic sensor element 127.

In the non-contact position sensor of this exemplary embodiment, the magnetic-detecting portion 113 is arranged in generally the center part of the intermediate portion 112 between the one-side arm where the magnet 116 is fixed and the another-side arm where the magnet 118 is fixed. However, similar effect is achieved even if the magnetic-detecting portion is arranged in any position shifting toward the one-side arm or the another-side arm along the intermediate portion 112.

In addition, although there are provided, in the non-contact position sensor of this exemplary embodiment, with the projecting portion 114 projecting upward on the magnetic-detecting portion 113 of the magnetic body 111, and another projecting portion 125 projecting downward on the magnetic-detecting portion 124 of the magnetic body 120, the similar effect is also achievable even if the magnetic-detecting portion 113 and the magnetic-detecting portion 124 are formed flat in shape.

Fifth Exemplary Embodiment

A non-contact position sensor in a fifth exemplary embodiment will be described hereinafter with reference to the accompanying drawings.

Figure 20:
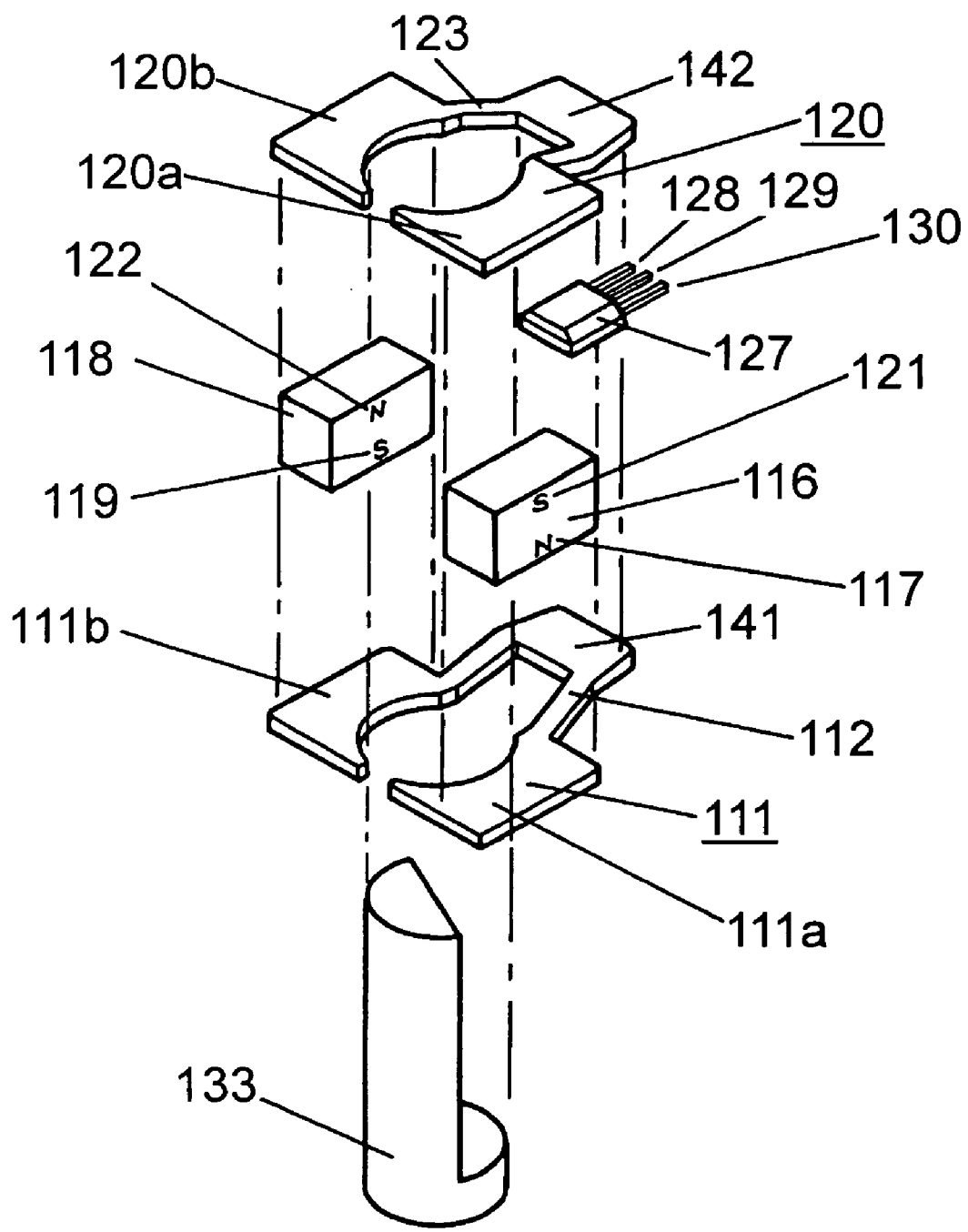
FIG. 20 is an exploded perspective view of a non-contact position sensor of a fifth exemplary embodiment of this invention.
Figure 21:
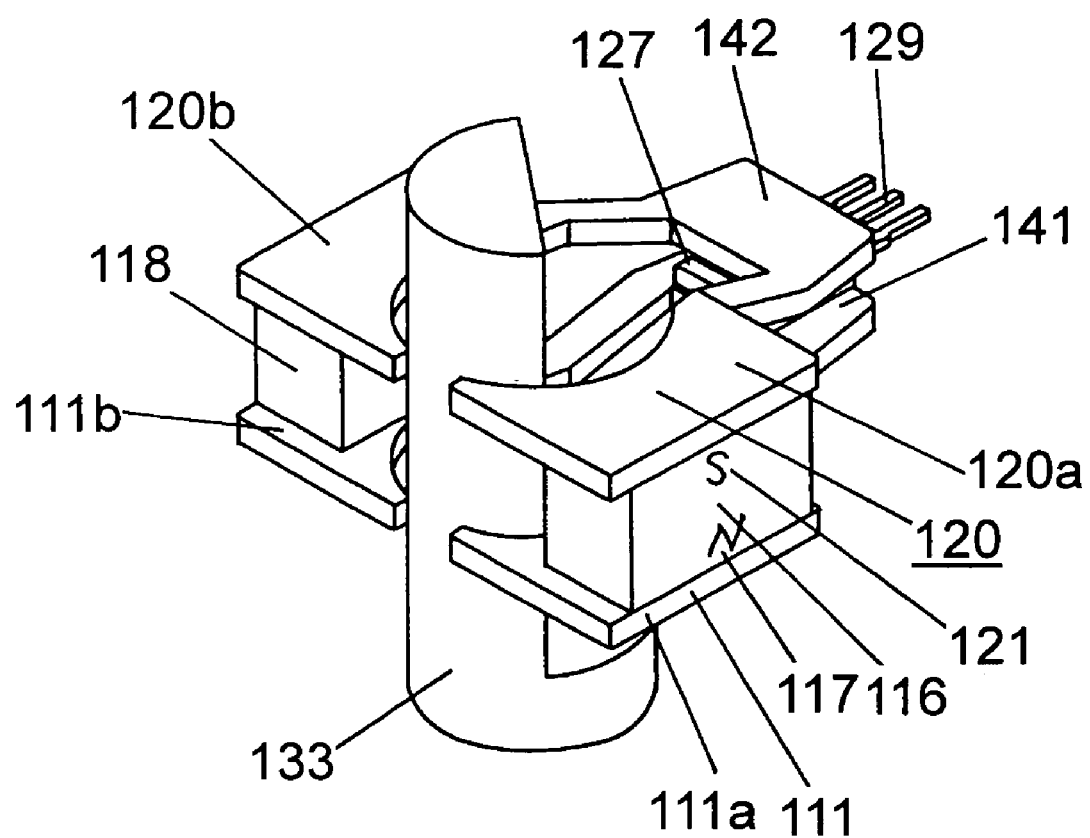
FIG. 21 is a perspective view of the non-contact position sensor of the fifth exemplary embodiment of this invention.

FIG. 20 is an exploded perspective view of a non-contact position sensor of the fifth exemplary embodiment, and FIG. 21 is a perspective view of the same.

Since the non-contact position sensor shown in FIG. 20 and FIG. 21 is basically analogous in structure to the non-contact position sensor described in the fourth exemplary embodiment, like reference numerals are used to designate like structural components and their details will be omitted.

The non-contact position sensor of this exemplary embodiment has a structure wherein a magnetic sensor element 127 is held in position with an upper surface of a first magnetic-detecting portion 141 of a magnetic body 111 and a lower surface of a second magnetic-detecting portion 142 of a second magnetic body 120. This structure eliminates clearances between the magnetic sensor element 127 and the magnetic-detecting portion 141, and also between the magnetic sensor element 127 and the magnetic-detecting portion 142, and thereby it provides for a valid effect of increasing sensitivity of output signal produced by the magnetic sensor element 127.

In addition, the non-contact position sensor of this exemplary embodiment is so constructed that inner surfaces of an one-side arm 111a and an another-side arm 111b of the magnetic body 111, and one-side arm 120a and the another-side arm 120b of the magnetic body 120 are formed into circular arc, so that the inner surfaces of the one-side arm 111a and the another-side arm 111b of the magnetic body 111, and the one-side arm 120a and the another-side arm 120b of the magnetic body 120 are in conformity to an outer periphery of an object 133 to be detected.

This structure reduces a gap between the magnetic body 111 and the object 133 to be detected, as well as a gap between the magnetic body 120 and the object 133 to be detected, so as to reduce a loss resulting from lines of magnetic force passing through the air. Hence, it increases the sensitivity of output signal produced by the magnetic sensor element 127.

Sixth Exemplary Embodiment

A non-contact position sensor in a sixth exemplary embodiment of the present invention will be described hereinafter with reference to the accompanying drawings.

Figure 22:
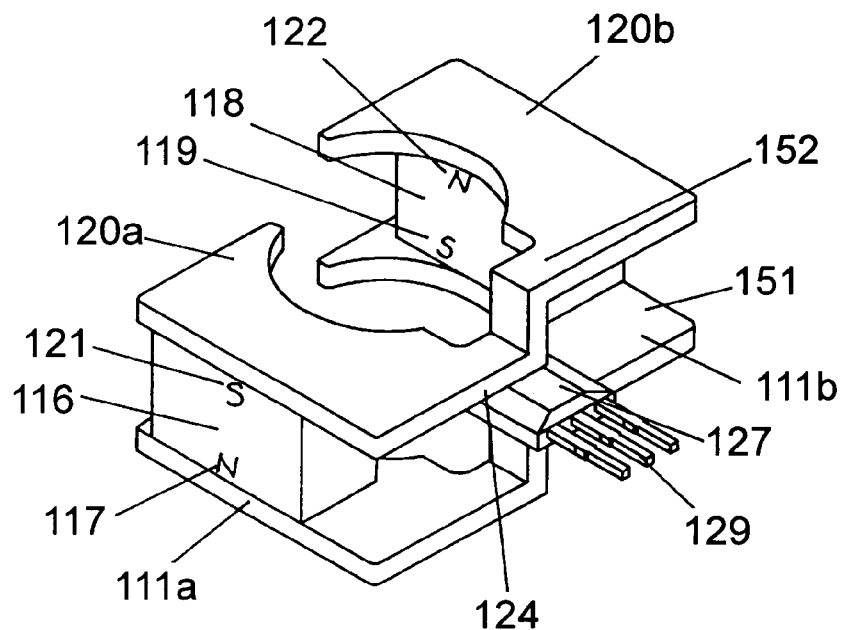
FIG. 22 is a perspective view of a non-contact position sensor of a sixth exemplary embodiment of this invention.
Figure 23:
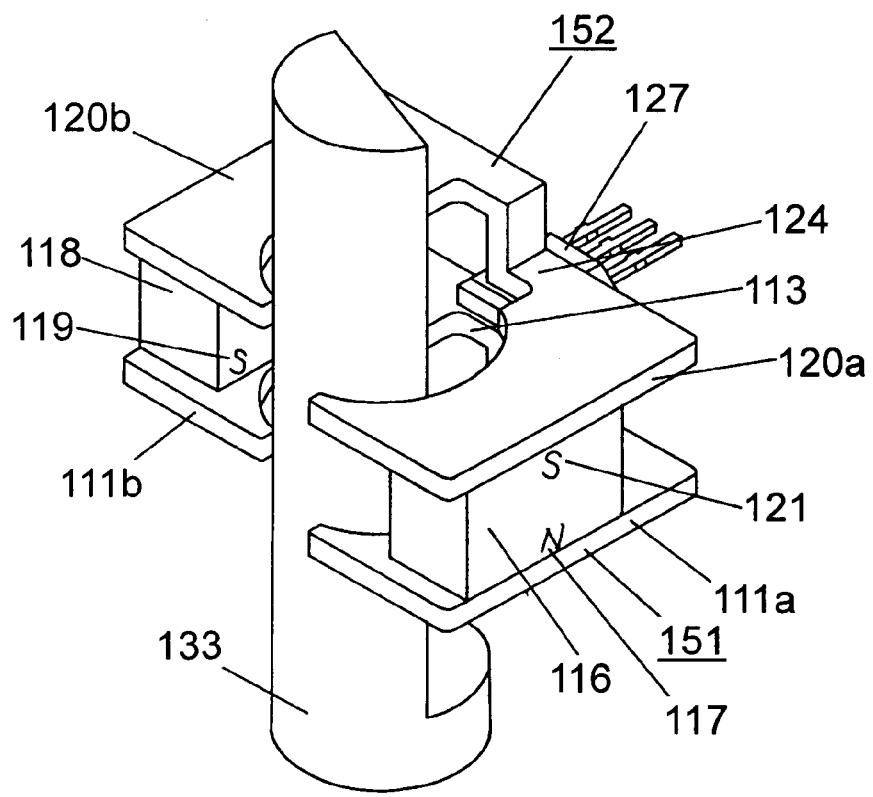
FIG. 23 is a perspective view of the non-contact position sensor of the sixth exemplary embodiment of this invention, depicting a state in which an object to be detected is inserted therethrough.

FIG. 22 is a perspective view of a non-contact position sensor of the sixth exemplary embodiment of this invention, and FIG. 23 is a perspective view of the sensor in a state where an object to be detected is inserted therein.

Since the non-contact position sensor shown in FIG. 22 and FIG. 23 is basically analogous in structure to the non-contact position sensor described in the fourth exemplary embodiment, like reference numerals are used to designate like structural components and their details will be omitted.

In the non-contact position sensor of this exemplary embodiment, the structure is so devised that a first magnetic body 151 and a second magnetic body 152 are formed into a stepped-level configuration, and a first magnet 116 and a second magnet 118 disposed generally in parallel to each other are arranged on different planes so that they do not face each other. This structure prevents lines of magnetic force from passing directly through the air between the magnet 116 and the magnet 118, rather than passing through the magnetic body 151 and the magnetic body 152. As a result, sensitivity of output signal produced by the magnetic sensor element 127 improves since the lines of magnetic force that pass through the magnetic sensor element 127 increase.

Seventh Exemplary Embodiment

A non-contact position sensor in a seventh exemplary embodiment of the present invention will be described hereinafter with reference to the accompanying drawings.

Figure 24:
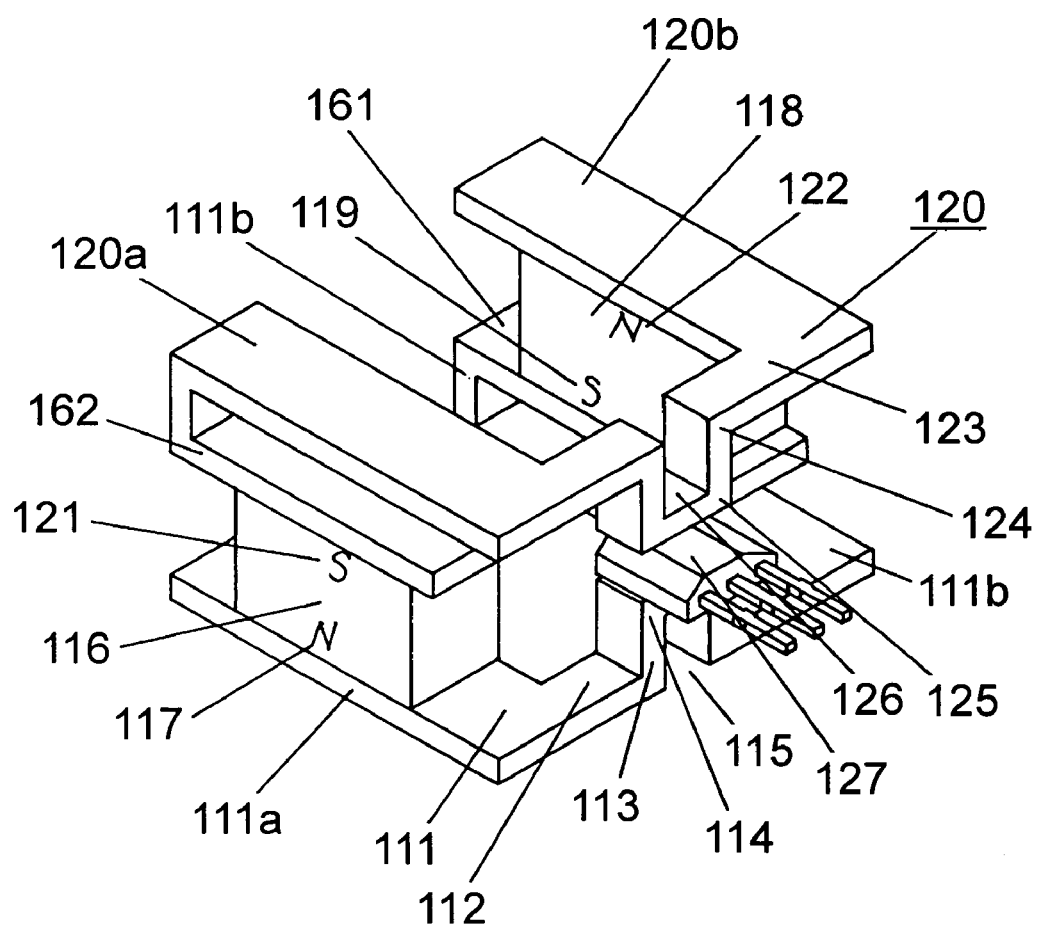
FIG. 24 is a perspective view of a non-contact position sensor of a seventh exemplary embodiment of this invention.

FIG. 24 is a perspective view of a non-contact position sensor of the seventh exemplary embodiment of this invention.

Since the non-contact position sensor shown in FIG. 24 is basically analogous in structure to the non-contact position sensor described in the fourth exemplary embodiment, like reference numerals are used to designate like structural components and their details will be omitted.

In the non-contact position sensor of this exemplary embodiment, a first magnet supporting member 161 is disposed to an another-side arm 111b of a first magnetic body 111, and a second magnet supporting member 162 is disposed to an one-side arm 120a of a second magnetic body 120. The magnet supporting member 161 and an another-side arm 120b of the second magnetic body 120 hold a second magnet 118, and the magnet supporting member 162 and an one-side arm 111a of the magnetic body 111 hold a first magnet 116. Thus, the first magnet 116 and the second magnet 118 disposed in parallel to each other are so arranged on different planes that they do not face each other. In addition, a first magnetic-detecting portion 113 of the magnetic body 111 is provided with an upwardly projecting first projecting portion 114, and a second magnetic-detecting portion 124 of the magnetic body 120 is provided with a downwardly projecting second projecting portion 125.

This structure prevents lines of magnetic force from passing directly through the air between the magnet 116 and the magnet 118, rather than passing through the magnetic body 111 and the magnetic body 120. In addition, since it is provided with the upwardly projecting first projecting portion 114 on the magnetic-detecting portion 113 and the downwardly projecting second projecting portion 125 on the magnetic-detecting portion 124, lines of magnetic force originating from the magnet 116 and the other magnet 118 concentrate into the projecting portion 114 as well as the projecting portion 125. As a result, sensitivity of output signal produced by the magnetic sensor element 127 improves since the lines of magnetic force that pass through the magnetic sensor element 127 increase.

Eighth Exemplary Embodiment

A non-contact position sensor in an eighth exemplary embodiment of the present invention will be described hereinafter with reference to the accompanying drawings.

Figure 25:
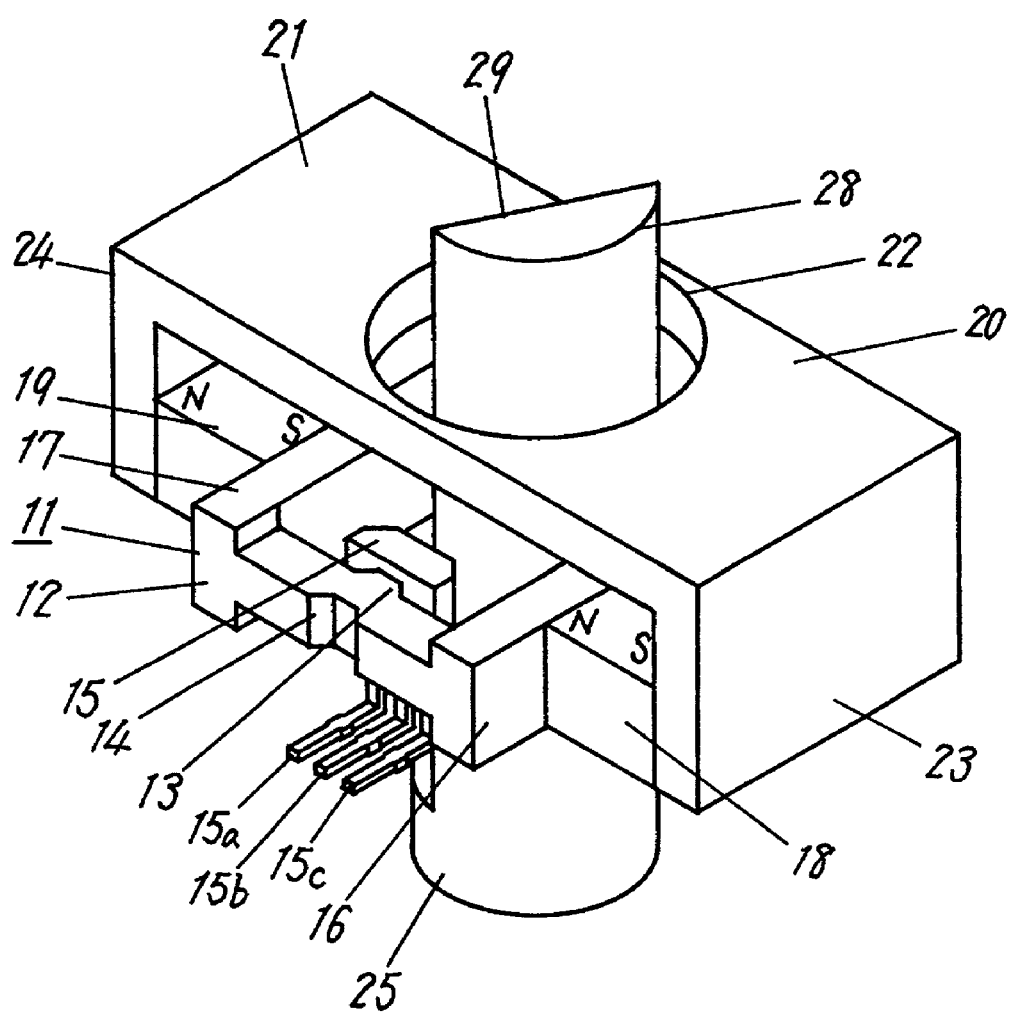
FIG. 25 is a perspective view of a non-contact position sensor of an eighth exemplary embodiment of this invention, depicting a state in which an object to be detected is inserted therethrough.

FIG. 25 is a perspective view depicting a state in that an object to be detected is inserted into a non-contact position sensor of the eighth exemplary embodiment of this invention.

The non-contact position sensor of this exemplary embodiment is provided with a projecting portion 213 at generally the center of a sensor element supporting portion 212 in a manner to project inward of the sensor, a recessed portion 214 on an another-side arm of the projecting portion 213, and a magnetic sensor element 215 is disposed to a tip end of the projecting portion 213. Further, the magnetic sensor element 215 is provided with a power supply terminal 215a, a GND terminal 215b and an output terminal 215c. The power supply terminal 215a is electrically connected to a power supply (not show in the figure), the GND terminal 215b is electrically connected to the ground (not show in the figure), and the output terminal 215c is electrically connected to a computer, or the like (not show in the figure).

A first magnet supporting portion 216 is disposed to an end of the sensor element supporting portion 212, and a second magnet supporting portion 217 is disposed to the another-side arm, so that, together with the sensor element supporting portion 212, they configure a U shape as a whole. A first magnet 218 having a principal ingredient of SmCo, for instance, is fixed on its N-pole 117 to an outer surface of the first magnet supporting portion 216. A second magnet 219 also having a principal ingredient of SmCo, for instance, is fixed on its S-pole to an outer surface of the magnet supporting portion 217. A U-shaped reinforcing magnetic body 220 provided with an aperture 222 in an intermediate portion 221 is positioned above the first magnetic body 211. The reinforcing magnetic body 220 fixes an S-pole of the magnet 218 on an inner surface of its one-side arm 223, and an N-pole of the magnet 219 on an inner surface of its another-side arm 224.

In this exemplary embodiment, the reinforcing magnetic body 220 is positioned above the first magnetic body 211, and an object 225 to be detected is inserted through the aperture 222 provided in the reinforcing magnetic body 220. Because of the structure comprised of the reinforcing magnetic body 220 connecting directly the magnet 218 and the magnet 219, a number of lines of magnetic force increases in a magnetic circuit consisting of the magnetic body 211, the magnet 219, the reinforcing magnetic body 220, and the magnet 218, thereby having an effect of increasing sensitivity of an output provided by the magnetic sensor element 215.

In addition, because of the projecting portion 213, which projects inwardly, provided on the sensor element supporting portion 212, and the magnetic sensor element 215 disposed to the tip end of this projecting portion 213, the lines of magnetic force originating from the magnet 218 and the magnet 219 concentrate in this projecting portion 213, and thereby it further increases sensitivity of output signals produced from the magnetic sensor element 215.

The non-contact position sensor constructed as above is assembled in a manner, which is described next.

First, the projecting portion 213, projecting inwardly, and the recessed portion 214 are formed with drawing process in generally the center portion of the sensor element supporting portion 212 of the first magnetic body 211, which is prefabricated in the shape of letter U.

In this embodiment, since the recessed portion 214 is formed on the another-side arm of the projecting portion 213, there is not lines of magnetic force originating from the magnet 218 and the magnet 219 to pass through the recessed portion 214, and thereby the lines of the magnetic force concentrate in the tip end of the projecting portion 213. This further increases lines of the magnetic force that pass through the magnetic sensor element 215, thereby increasing furthermore the sensitivity of output signals produced by the magnetic sensor element 215.

Next, after application of adhesive on an outer surface of the first magnet supporting portion 216 at one-side arm of the magnetic body 211 and also an outer surface of the second magnet supporting portion 217 at the another-side arm, the first magnet 218 is fixed on its N-pole to the outer surface of the magnet supporting portion 216, and the second magnet 219 thereafter on its S-pole to the outer surface of the magnet supporting portion 217.

Then, an inner surface of the one-side arm 223 of the reinforcing magnetic body 220, in which the aperture 222 is prefabricated, is fixed to an S-pole of the magnet 218, and an inner surface of the another-side arm 224 of the reinforcing magnetic body 220 is fixed to an N-pole of the magnet 219. At this time, the reinforcing magnetic body 220 is to be fixed in a position that it situates above the magnetic body 211.

Finally, the magnetic sensor element 215 integrally formed in advance with the power supply terminal 215a, the GND terminal 215b, and the output terminal 215c is fixed to the tip end of the projecting portion 213.

The non-contact position sensor constructed and assembled as above operates in a manner, which will be described next with reference to the accompanying drawings.

A power supply (not show in the figure) is connected to the power supply terminal 215a, the GND terminal 215b is connected to the ground (not show in the figure), and a potential of 5V is applied. The object 225 to be detected, provided with a semicircular portion 228 and a cutout portion 229, is inserted in the magnetic body 211 through the aperture 222 in the reinforcing magnetic body 220, and the object 225 to be detected is rotated thereafter.

Figure 26:
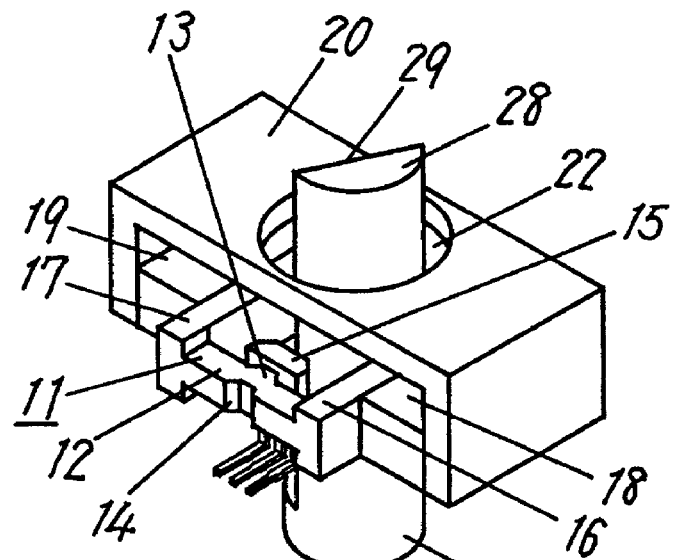
FIG. 26 are expository illustrations showing operating states of the non-contact position sensor.
Figure 26:
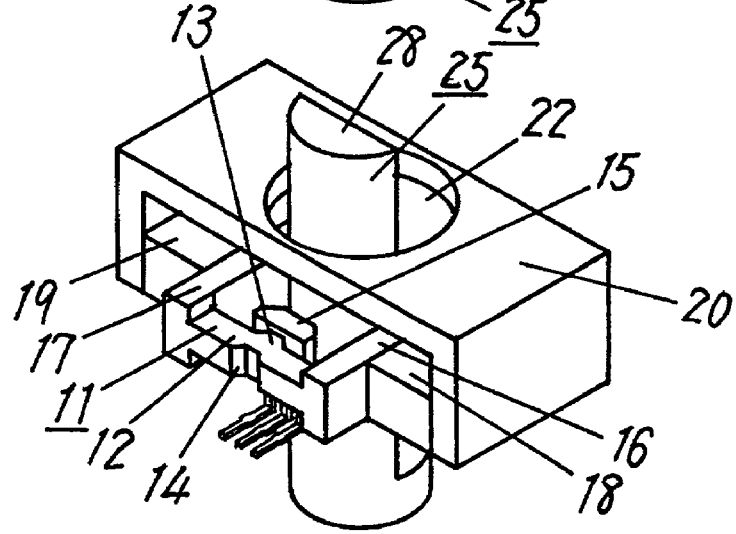
Figure 26:
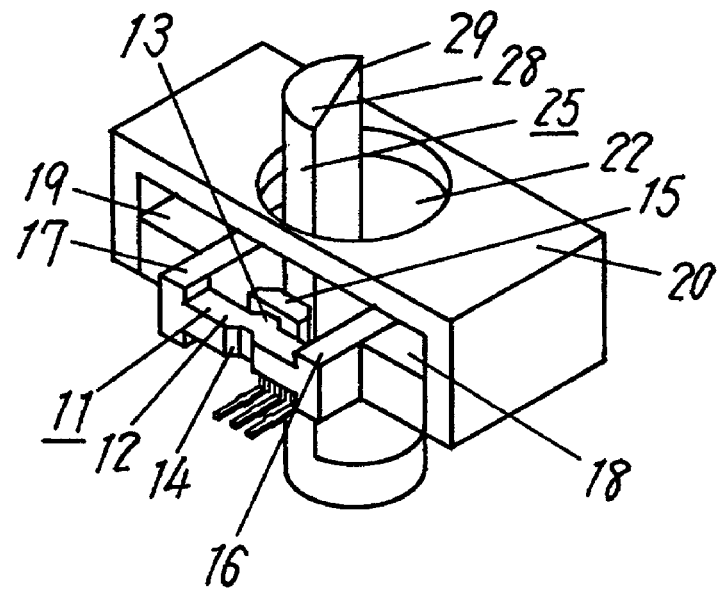
Figure 27:
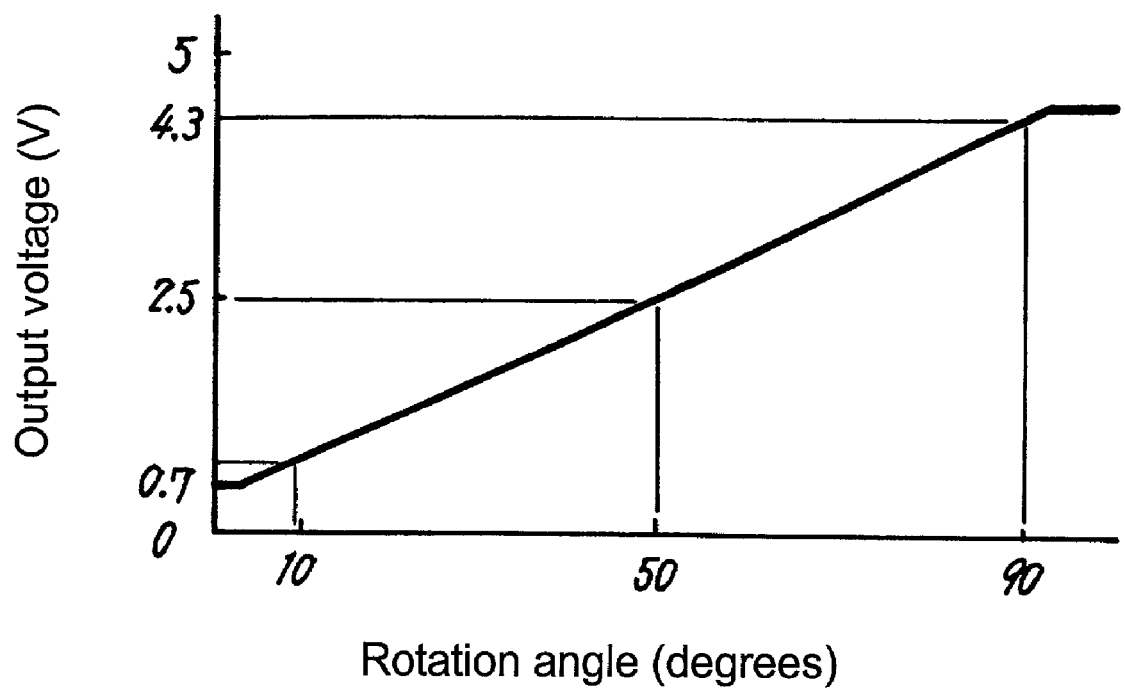
FIG. 27 is a graphic chart showing a relation of output voltage to rotating angle of the object to be detected.

A state shown in FIG. 26(a) is assumed to be 10 degrees in rotating angle of the object 225 to be detected. At this moment, the semicircular portion 228 of the object 225 being detected locates in the vicinity of the magnet 218, and the cutout portion 229 locates in the vicinity of the magnet 219. A part of the lines of magnetic force originating from the N-pole of the magnet 218 pass through the magnetic sensor element 215 via the object 225 being detected, flow to the projecting portion 213, guided to the magnet supporting portion 217 at the another-side arm of the magnetic body 211, and reach the S-pole of the magnet 219. At this time, an output voltage at the output terminal 215c becomes approx. 0.7V, as shown in FIG. 27. When rotating angle of the object 225 being detected becomes 50 degrees, the semicircular portion 228 locates in such an orientation that is perpendicularly to both the magnet supporting portion 216 and the magnet supporting portion 217, as shown in FIG. 26(b). At this moment, the lines of magnetic force originating from the N-pole 117 of the magnet 218 reach the S-pole of the magnet 219 via the object 225 being detected and the magnet supporting portion 217, since both of distances between the object 225 being detected and the magnet supporting portion 216 and between the object 225 being detected and the magnet supporting portion 217 become very small. As a result, the lines of magnetic force do not pass through the magnetic sensor element 215. At this time, output voltage at the output terminal 215c becomes approx. 2.5V, as shown in FIG. 27.

Furthermore, when rotating angle of the object 225 being detected comes to 90 degrees, the semicircular portion 228 locates in the vicinity of the magnet 219, and the cutout portion 229 locates in the vicinity of the magnet 218. At this moment, the lines of magnetic force originating from the N-pole of the magnet 218 flow to the projecting portion 213 via the magnet supporting portion 216, guided to the magnet supporting portion 217 through the magnetic sensor element 215 and the object 225 being detected, and reach the S-pole of the magnet 219. At this time, an output voltage at the output terminal 215c becomes approx. 4.3V, as shown in FIG. 27.

In other words, the lines of the magnetic force pass through the magnetic sensor element 215 from the object 225 to the projecting portion 213, in the state that the semicircular portion 228 locates in the vicinity of the magnet 218, whereas the lines of magnetic force pass through the magnetic sensor element 215 from the projecting portion 213 to the object 225, in the state that the semicircular portion 228 locates in the vicinity of the magnet 219. Therefore, as the object 225 rotates, output signal shown in FIG. 27 is output in response to the rotating angle. This output signal is input to a computer or the like (not show in the figure) to measure the rotating angle of the object 225 being detected.

In the non-contact position sensor of this exemplary embodiment, as described, magnetic flux density between the object 225 being detected and the projecting portion 213 changes depending on rotating angle of the object 225 being detected, because the object 225 being detected is arranged in the magnetic body 211. It therefore has the like advantageous effects as those described in the first exemplary embodiment, as compared to the similar sensors of the prior art.

Moreover, since the magnetic body 211 is U-shaped, the magnet supporting portion 216 and the magnet supporting portion 217 confront generally in parallel with each other in this exemplary embodiment, and the cutout portion 229 comes close to the magnet supporting portion 217 when the semicircular portion 228 moves closest to the magnet supporting portion 216. Since this allows a largest number of lines of magnetic force originating from the magnet 218 and the magnet 219 to pass through the magnetic sensor element 215 toward the projecting portion 213, sensitivity of output produced by the magnetic sensor element 215 improves as a result.

Figure 28:
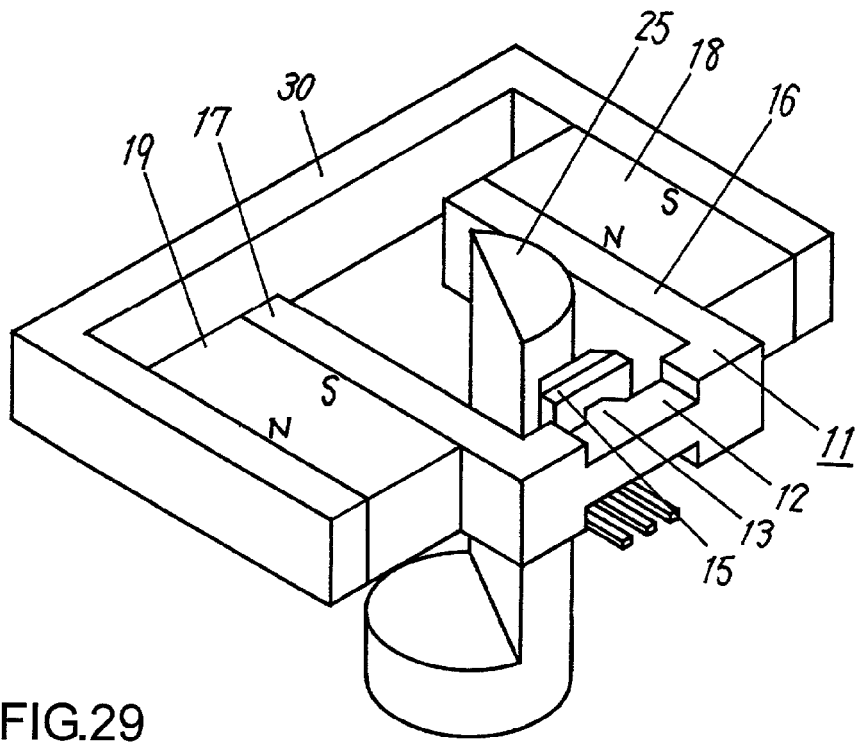
FIG. 28 is a perspective view of another non-contact position sensor of the eighth exemplary embodiment of this invention, depicting a state in which an object to be detected is inserted therethrough.

In the non-contact position sensor of this exemplary embodiment, although the reinforcing magnetic body 220 is disposed in a position above the magnetic body 211, like effect can be achieved even if the reinforcing magnetic body 230 is disposed to the same plane as the magnetic body 211, as shown in FIG. 28.

Ninth Exemplary Embodiment

A non-contact position sensor in a ninth exemplary embodiment of the present invention will be described hereinafter with reference to the accompanying drawings.

Figure 29:
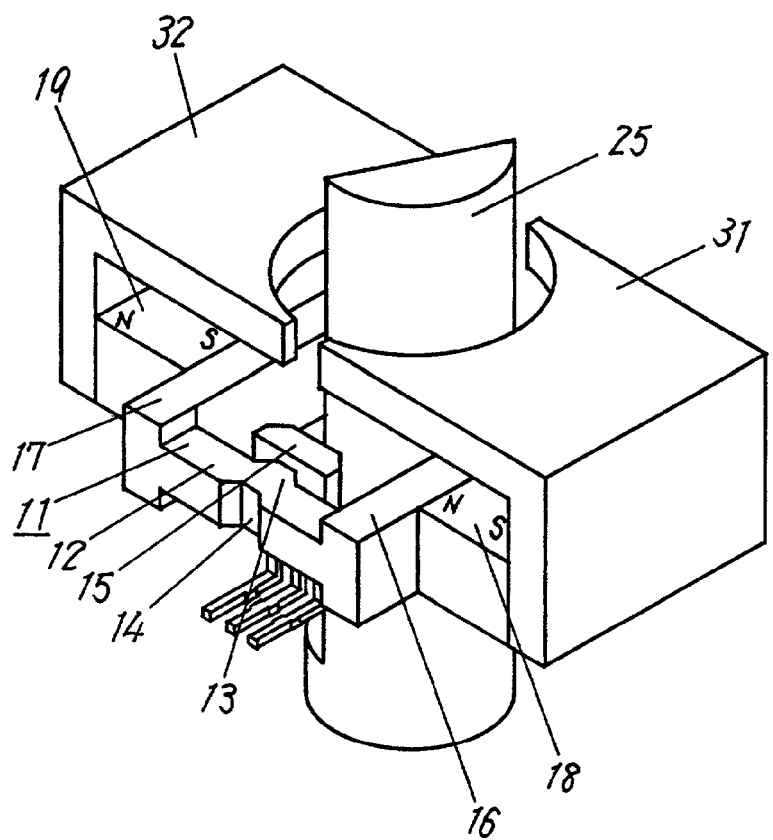
FIG. 29 is a perspective view of a non-contact position sensor of a ninth exemplary embodiment of this invention, depicting a state in which an object to be detected is inserted therethrough.

FIG. 29 is a perspective view depicting a state in which an object to be detected is inserted in a non-contact position sensor of the ninth exemplary embodiment of this invention.

Since the non-contact position sensor shown in FIG. 29 is analogous in structure to that of FIG. 25 described in the eighth exemplary embodiment, like reference numerals are used to designate like structural components and their details will be omitted.

In the non-contact position sensor of this exemplary embodiment, a second magnetic body 231 is provided in place of the reinforcing magnetic body in the eighth exemplary embodiment, in a manner that one-side arm of it is fixed to an S-pole of a first magnet 218, and the another-side arm of it is positioned above a first magnet supporting portion 216 of a first magnetic body 211. In addition, a third magnetic body 232 is provided in a manner that one-side arm of it is fixed to an N-pole of a second magnet 219, and another-side arm of it is positioned above a second magnet supporting portion 217 of the magnetic body 211. An object 225 to be detected consisting of a rotary shaft of an object under detection is disposed in a spaces formed in the magnetic body 211, and between the magnetic body 231 and the magnetic body 232.

A consideration is made for a case in which magnetic force is generated in the object 225 to be detected by electromagnetic induction when the object 225 to be detected passes by the magnet 218 and the magnet 219. In the present exemplary embodiment, the object 225 to be detected is disposed in the spaces formed in the magnetic body 211, and between the magnetic body 231 and the magnetic body 232. For this reason, lines of magnetic force that pass the object 225 to be detected via the magnetic body 211 and lines of magnetic force that pass the object 225 to be detected via the magnetic body 231 and the magnetic body 232 are in directions opposite to each other. Since directions of the magnetic forces produced in the object 225 to be detected by electromagnetic induction due to rotation of the object 225 are opposite to each other, the magnetic forces produced in the object 225 cancel out, and thereby it has a valid effect of stabilizing the magnetic forces that pass the object 225 to be detected.

In addition, since inner surfaces of the magnetic body 231 and the magnetic body 232 that come to contact with the object 225 to be detected are formed in circular arc, and that the inner surfaces of the magnetic body 231 and the magnetic body 232 are in conformity to the object 255 to be detected, there reduces a gap between the magnetic body 231 and the object 225 to be detected, as well as a gap between the magnetic body 232 and the object 225 to be detected. This results in a reduction of losses attributable to the lines of magnetic force passing through the air, and thereby it provides for a valid effect of increasing sensitivity of output signal produced by the magnetic sensor element 215.

Tenth Exemplary Embodiment

Figure 30:
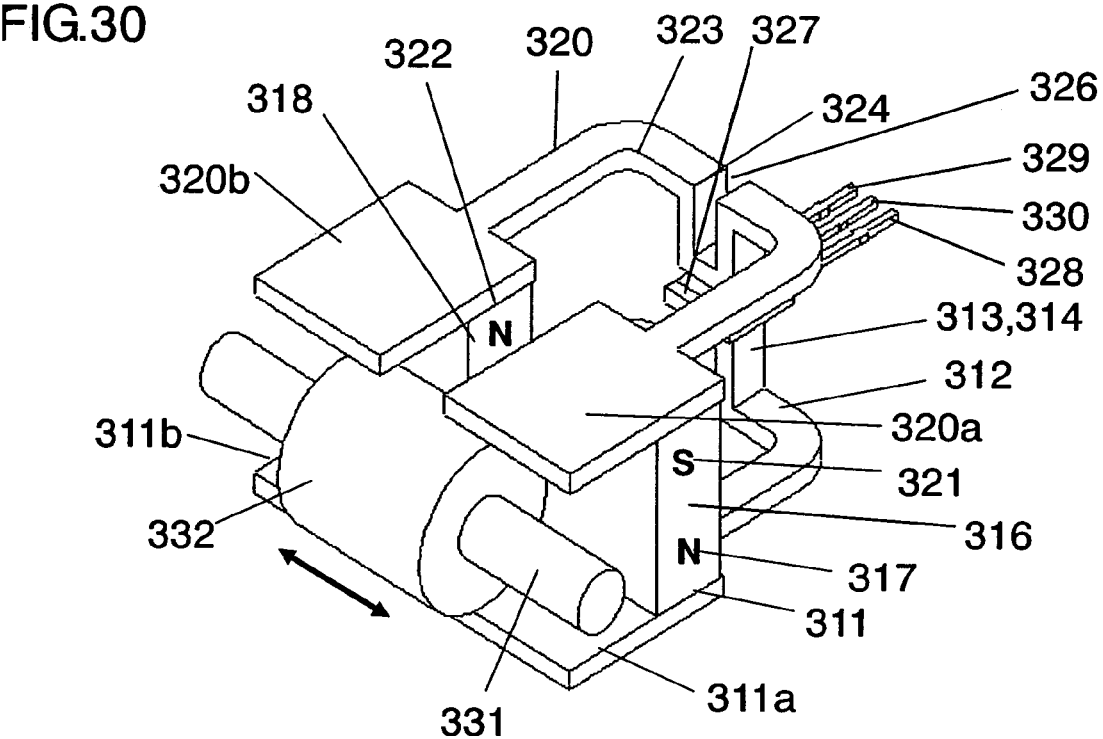
FIG. 30 is a perspective view of a non-contact position sensor of a tenth exemplary embodiment of this invention, depicting a state in which an object to be detected is inserted therethrough.
Figure 31:
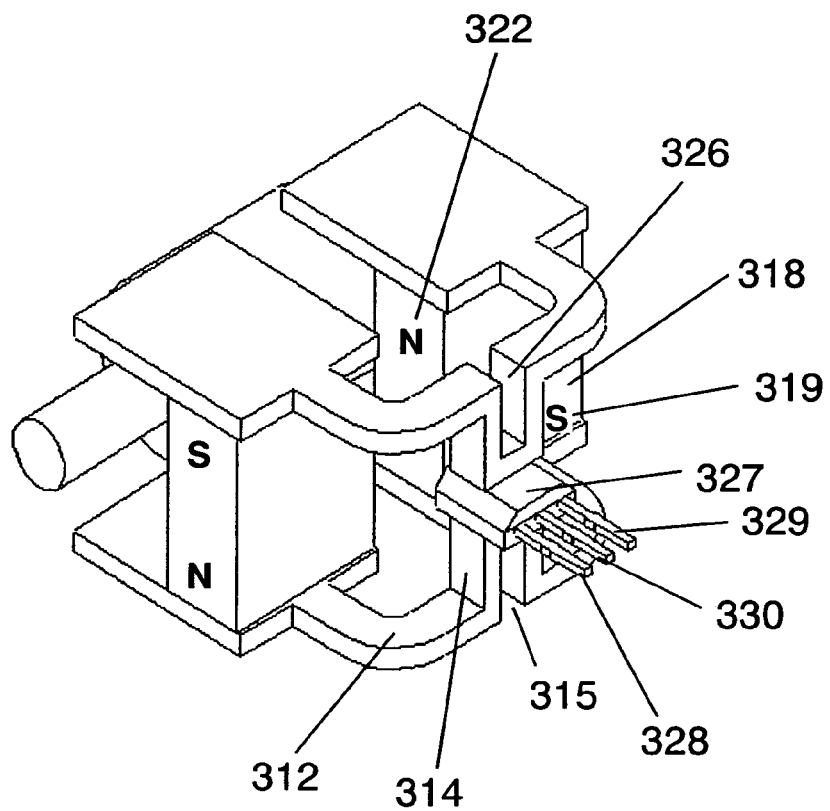
FIG. 31 is another perspective view of the non-contact position sensor of the tenth exemplary embodiment of this invention, depicting the state in which the object to be detected is inserted as viewed from a backside thereof.

FIG. 30 is a perspective view depicting a state in which an object to be detected is disposed to a non-contact position sensor of a tenth exemplary embodiment of this invention, and FIG. 31 is another perspective view of the same sensor as observed from behind.

In FIG. 30 and FIG. 31, a first magnetic body 311 having a shape of letter U is provided with a first magnetic-detecting portion 313 on an upper surface at an intermediate portion 312, and a first projecting portion 314 projecting upward on the magnetic-detecting portion 313. There also is a recessed portion 315 provided on the other side of the first projecting portion 314. A first magnet 316 having a principal ingredient of SmCo, for instance, is fixed on its N-pole 317 to an upper surface of an one-side arm 311a of the magnetic body 311, and a second magnet 318 having a principal ingredient of SmCo is fixed on its S-pole 319 to an another-side arm 311b of the magnetic body 311. A second magnetic body 320 having a shape of letter U has an S-pole 321 of the magnet 316 fixed to a lower surface of its one-side arm 320a, and an N-pole 322 of the magnet 318 fixed to a lower surface of its another-side arm 320b. The magnetic body 320 is also provided on a lower surface at an intermediate portion 323 with a second magnetic-detecting portion 324 in a manner to confront the magnetic-detecting portion 313 of the magnetic body 311. Further, the magnetic-detecting portion 324 of the magnetic body 320 is provided with a second projecting portion 325 projecting downward, and a recessed portion 326 on the other side of the projecting portion 325. A magnetic sensor element 327 is held between the magnetic-detecting portion 313 and the magnetic-detecting portion 324.

In this exemplary embodiment, since the magnetic sensor element 327 is held in position with the upper surface of the magnetic-detecting portion 313 and the lower surface of the magnetic-detecting portion 324, there is no clearance between the magnetic sensor element 327 and the magnetic-detecting portion 313, or between the magnetic sensor element 327 and the magnetic-detecting portion 324, thereby increasing sensitivity of output signal produced by the magnetic sensor element 327.

Also, since the magnetic-detecting portion 313 is provided with the projecting portion 114, which projects upwardly, and the magnetic-detecting portion 324 is provided with the projecting portion 125, which projects downwardly, lines of magnetic force from the magnet 316 and the other magnet 318 concentrate into the projecting portion 314 and the other projecting portion 325. Since this increases sensitivity of an output provided by the magnetic sensor element 327, it consequently improves output characteristic of the non-contact position sensor.

The magnetic sensor element 327 is provided with a power supply terminal 328, an output terminal 329 and a GND terminal 330, and they are connected in the like manner as described in the foregoing exemplary embodiments.

An object 331 to be detected is provided at the center thereof with a detective section 332 of a large outer diameter, and a length of the detective section 332 is set longer than any width of the one-side arms and the another-side arms of the magnetic body 311 and the magnetic body 320. Moreover, a width of the one-side arm 311a of the magnetic body 311 is set to be generally equal to that of the one-side arm 320a of the magnetic body 320, and a width of the another-side arm 311b of the magnetic body 311 is also set to be generally equal to that of the another-side arm 320b of the magnetic body 320.

In this exemplary embodiment, a detectable distance of the object 331 to be detected is designed as to be a distance derived by subtracting a length of the detective section 332 from the sum of the width of the one-side arm 311a, the width of the another-side arm 311b, and a space between the one-side arm 311a and the another-side arm 311b.

According to the above structure, the object 331 to be detected moves from a point, where one end of the detective section 332 is to locate by the one-side arms of the magnetic body 311/the magnetic body 320 at one extremity along a moving direction of the object 331, to the other point, where the other end of the detective section 332 is to locate by the another-side arms of the magnetic body 311/the magnetic body 320 at the other extremity along the moving direction of the object 331. An effect is therefore provided that stabilizes linearity of an output characteristic over the entire moving distance.

The non-contact position sensor of this exemplary embodiment of the invention constructed as above is assembled in a manner, which is described hereinafter.

First, the first projecting portion 314 and the recessed portion 315 are formed in the intermediate portion of the first magnetic body 311, which is prefabricated in the shape of letter U.

Next, adhesive is applied to an upper surface of the one-side arm 311a and an upper surface of the another-side arm 311b of the magnetic body 311, the first magnet 316 is fixed on its N-pole 317 to the upper surface of the one-side arm 311a, and the second magnet 318 is also fixed on its S-pole 319 to the another-side arm 311b.

Then, the second projecting portion 325 and the recessed portion 326 are formed in the intermediate portion 323 of the second magnetic body 320 prefabricated in the shape of letter U.

In this exemplary embodiment, since the recessed portion 326 is formed on the magnetic body 320, there is unlikely that any line of magnetic force of the magnet 316 and the magnet 318 to pass through the recessed portion 326, and thereby the lines of the magnetic force concentrate in the second magnetic-detecting portion 324. Since this increases lines of the magnetic force that pass through the magnetic sensor element 327, and also increases sensitivity of an output delivered from the output terminal 329 of the magnetic sensor element 327, it improves an output characteristic of the non-contact position sensor.

Next, the one-side arm 320a of the magnetic body 320 is fixed with adhesive to the S-pole 321 of the magnet 316, and the another-side arm 320b also with adhesive to the N-pole 322 of the magnet 318.

Finally, the magnetic sensor element 327 integrally formed in advance with the power supply terminal 328, the output terminal 329 and the GND terminal 330 is supported with another member (not show in the figure) so as to be located in a position between the magnetic-detecting portion 313 and the magnetic-detecting portion 324.

The non-contact position sensor constructed and assembled as above operates in a manner, which will be described next with reference to the accompanying drawings.

First, a power supply (not show in the figure) is connected to the power supply terminal 328, and the GND terminal 330 to the ground (not show in the figure). Then, after the object 331 to be detected, provided with the detective section 332, is placed in position between the one-side arm 311a and the another-side arm 311b and the one-side arm 320a and the another-side arm 320b, and the detective section 332 is moved linearly along a direction of an arrow.

Figure 32A:
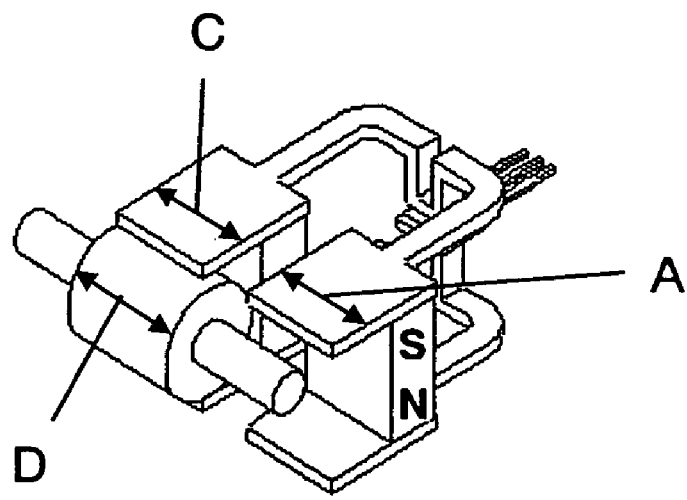
FIG. 32 are expository illustrations showing operating states of the non-contact position sensor.

Here, the width of the one-side arm 311a is denoted by A, the space between the one-side arm 311a and the another-side arm 311b is denoted by B, the width of the another-side arm 311b is denoted by C, and a length of the detective section 332 is denoted by D, as shown in FIG. 32(a). It is also assumed that a move position of the object 331 to be detected is 0 mm, when the center point of the detective section 332 situates at an intermediate point of the space between the one-side arm 311a and the another-side arm 311b.

Figure 33:
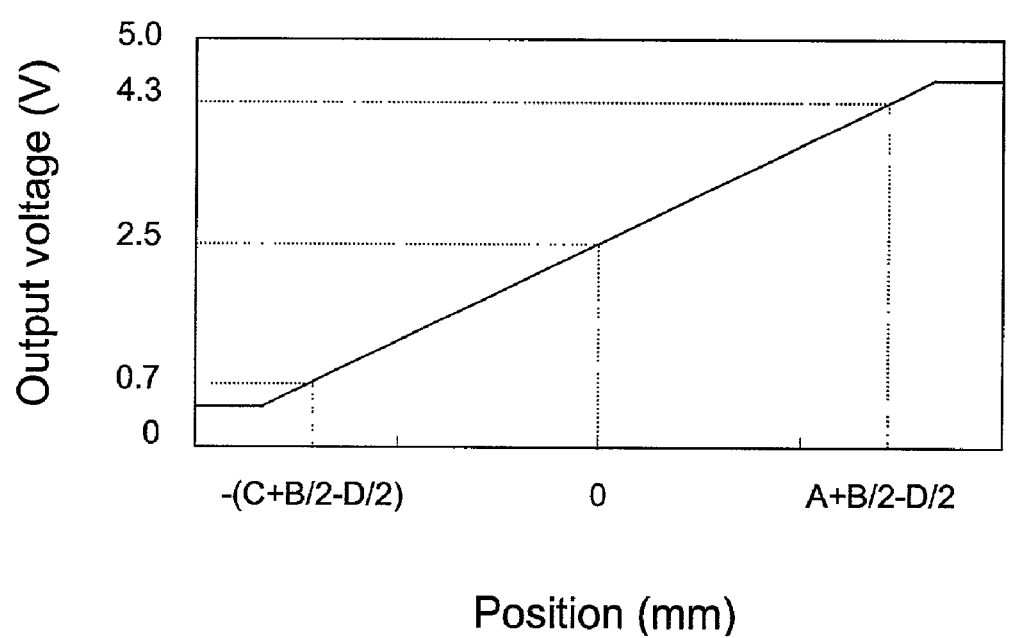
FIG. 33 is a graphic chart showing a relation of output voltage to moving distance of the object to be detected.
Figure 34:
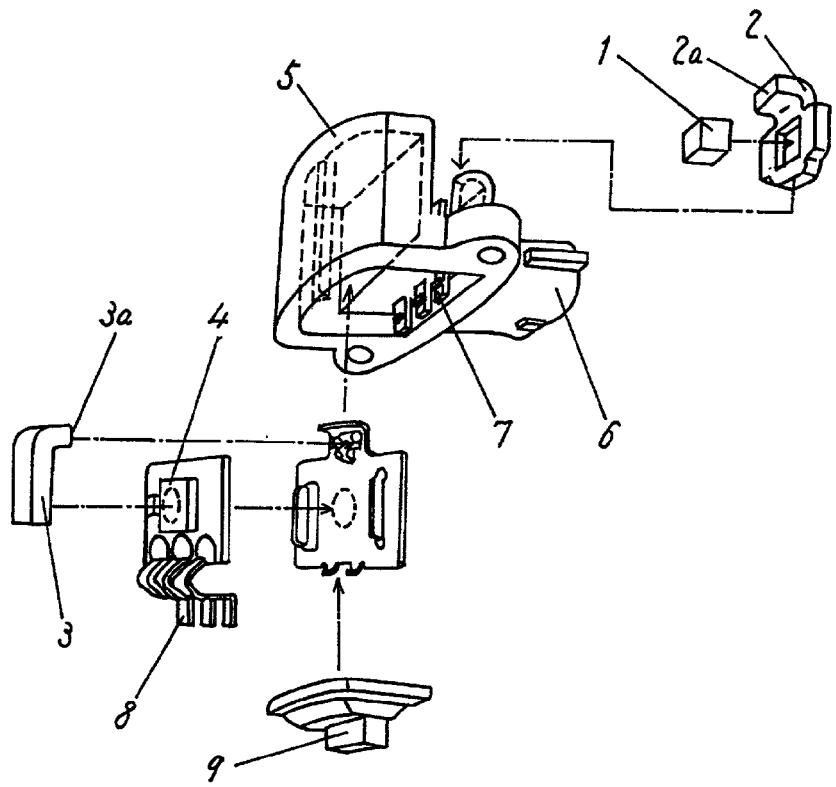
FIG. 34 is an exploded perspective view of a non-contact position sensor of the prior art.
Figure 35:
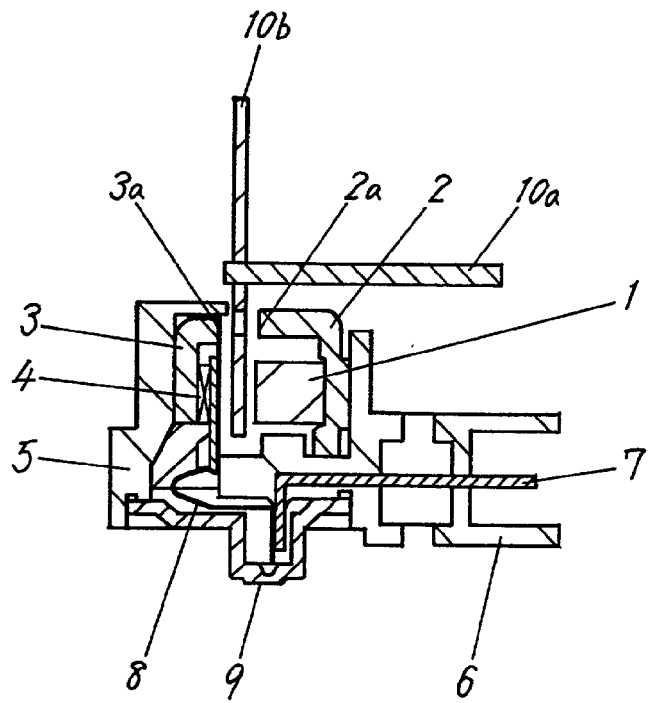
FIG. 35 is a sectioned side view of the non-contact position sensor of the prior art.
Figure 36:
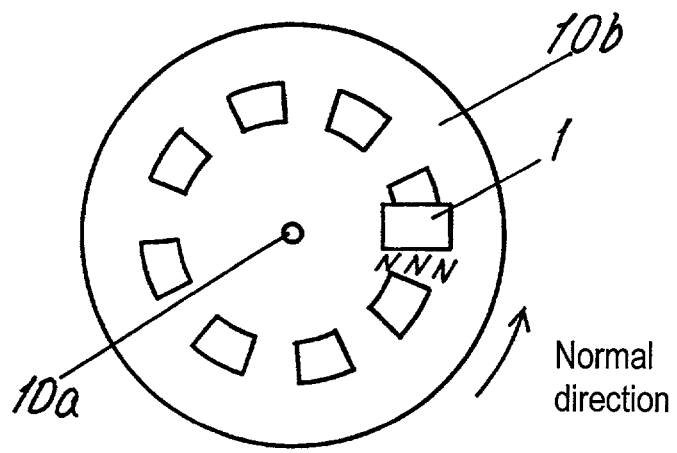
FIGS. 36(a) and (b) are schematic illustrations of magnetic shutter of the non-contact position sensor of the prior art, depicting magnetized states thereof.
Figure 36:
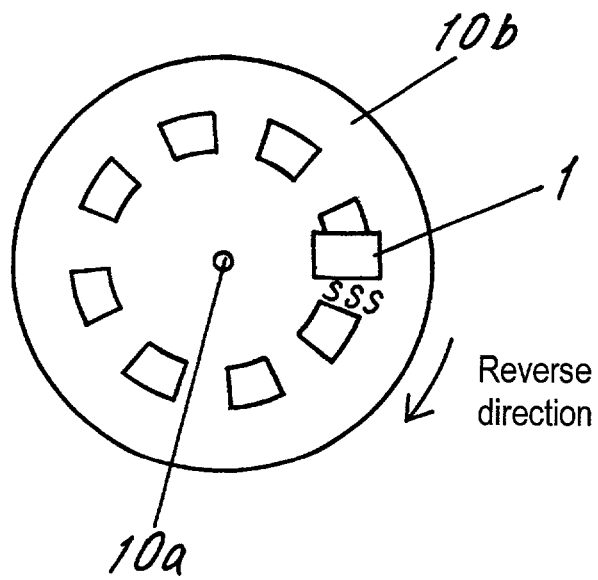
Figure 37A:
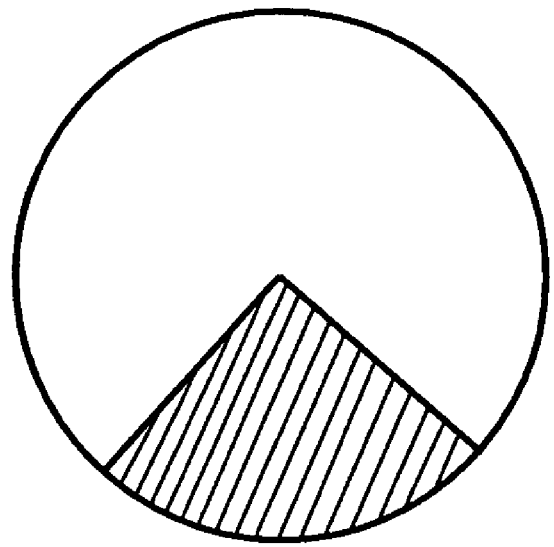
FIGS. 37 (a) and (b) illustrate fan-shaped and I-shaped shafts, respectively.
Figure 37B:
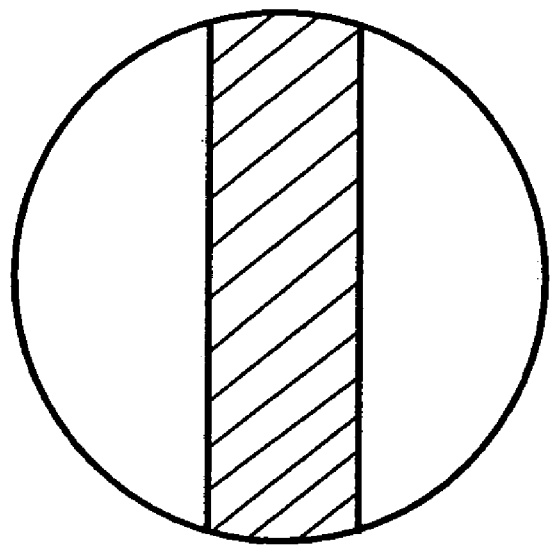

First, when one end of the detective section 332 by the another-side arms is located at a position in line with one end of the another-side arm 311b, that is, when the detective section 332 is in a position of —(C+B/2−D/2) mm, the detective section 332 is located in the vicinity of the magnet 318, which is furthest from the magnet 316. At this moment, lines of magnetic force originating from the N-pole 322 of the magnet 318 returns to the S-pole 319 of the magnet 318 via the another-side arm 320b of the magnetic body 320, the detective section 332, and the another-side arm 311b. Also, lines of magnetic force originating from the N-pole 317 of the magnet 316 pass from the magnetic-detecting portion 313 to the magnetic sensor element 327 via the one-side arm 311a, reach the magnetic-detecting portion 324, and return to the S-pole 321 of the magnet 316 through the one-side arm 320a. At this time, an output voltage at the output terminal 329 of the magnetic sensor element 327 becomes approx. 0.7V, as shown in FIG. 33.

In this exemplary embodiment, since the length D of the detective section 332 is set longer than the width C of the another-side arms of the magnetic body 311 and the magnetic body 320, magnetic field that passes the magnetic body 311 and the magnetic body 320 changes responsive to a very small linear displacement of the detective section 332, even when the detective section 332 is in such a position in the close vicinity of the magnetic body 311 or the magnetic body 320. It therefore provides for a valid effect of stabilizing the output characteristic.

Figure 32B:
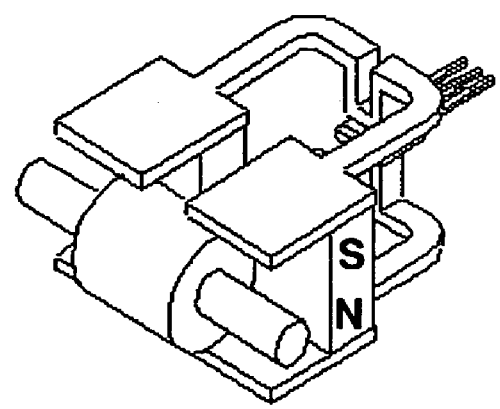
Figure 32C:
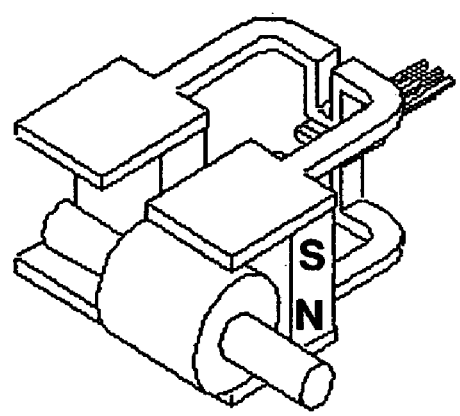

Furthermore, when the detective section 332 is in the 0 mm position, i.e. the detective section 332 is located at an equal distance from both the magnet 316 and the magnet 318, an as shown in FIG. 32(b), lines of the magnetic force into the detective section 332 are cancelled out. At this moment, the lines of magnetic force originating from the N-pole 317 of the magnet 316 loop in a way that they are introduced from the one-side arm 311a to the another-side arm 311b (not show in the figure), proceed from the another-side arm 320b to the one-side am 320a via the S-pole 319 and the N-pole 322 of the magnet 318, and return to the S-pole 321 of the magnet 316. At this moment, there is no line of the magnetic force passing through in the magnetic sensor element 327. And, output voltage from the output terminal 329 becomes approx. 2.5V, as shown in FIG. 33. Furthermore, when the detective section 332 moves to a position of (A+B/2−D/2) mm, the detective section 332 is located in the vicinity of the magnet 316, as shown in FIG. 32(c). At this moment, lines of magnetic force originating from the N-pole 317 of the magnet 316 return to the S-pole 321 of the magnet 316 through the one-side arm 311a, the detective section 332, and the one-side arm 320a. Also, lines of magnetic force originating from the N-pole 322 of the magnet 318 are guided through the another-side arm 320b and the magnetic-detecting portion 324, passes the magnetic sensor element 327 downward from the upper side, and return to the S-pole 319 of the magnet 318 via the magnetic-detecting portion 313 and the another-side arm 311b. At this time, output voltage from the output terminal 329 becomes approx. 4.3V, as shown in FIG. 33. In other words, the lines of magnetic force pass the magnetic sensor element 327 upwardly from its lower side in the state that the detective section 332 locates in the vicinity of the magnet 318, whereas the lines of magnetic force pass the magnetic sensor element 327 downward from its upper side in the state that the detective section 332 locates in the vicinity of the magnet 316. Therefore, as the detective section 332 reciprocates, output signal shown in FIG. 33 is output from the output terminal 329 according to the position of the detective section. This output signal is input to a computer or the like (not show in the figure) to detect position of the detective section 332.

Here, consideration is given in the case where the non-contact position sensor is used over a long period of time. In the non-contact position sensor of this exemplary embodiment, the object 331 to be detected is positioned between the one-side arm 311a and the another-side arm 311b, and the one-side arm 320a and the another-side arm 320b, or in the vicinity of them. As the result, the object 331 to be detected does not come in contact at all with the non-contact position sensor. Therefore, this assures no change in distance between the magnetic body 311 and the magnetic body 320 with respect to the object 331 to be detected attributable to wear and tear caused by sliding. Thus, there can be provided the non-contact position sensor capable of detecting position highly accurately over a long period of time.

Because the magnetic body 311 and the magnetic body 320 are U-shaped, both the one-side arm 311a and the another-side arm 311b can be arranged widthwise in the same plane, and both the one-side arm 320a and the another-side arm 320b also widthwise in the same plane. Therefore, the orientation of the magnetic bodies from the one-side arms to the another-side arms can be arranged generally in parallel to the direction of movement of the object 331 to be detected. Accordingly, the output sensitivity of the non-contact position sensor can be improved since the detective section 332 can be positioned for its movement in the close vicinity of the one-side arms to the another-side arms of the magnetic bodies.

In the non-contact position sensor of this exemplary embodiment, the intermediate portion 312 is arranged between the one-side arm where the magnet 316 is fixed and the another-side arm where the magnet 318 is fixed, and the magnetic-detecting portion 313 is disposed to generally the center part of the intermediate portion 312. However, similar effect is achieved even if the magnetic-detecting portion 313 is arranged in any position shifting toward the one-side arm or the another-side arm from the intermediate portion 312.

Furthermore, in the non-contact position sensor of this exemplary embodiment, although the structure is provided with the projecting portion 314 projecting upward on the magnetic-detecting portion 313, and another projecting portion 325 projecting downward on the magnetic-detecting portion 324, like effect is also achievable even if the magnetic-detecting portion 313 and the magnetic-detecting portion 324 are formed flat in shape.

In addition, Although the detective section 332 is formed in a cylindrical shape in the non-contact position sensor of this exemplary embodiment, like effect is also realized even with a semi-cylindrical shape or a square-pillar shape.

INDUSTRIAL APPLICABILITY

According to the structure of this invention, as described, rotating angle and moving speed of an object are easily detectable without providing any complicated members such as a magnetic flux shutter and the like, as used before, since magnetic flux density of the position sensor changes by rotation or linear movement of only the object under the detection. Also, detection of a rotating angle of the rotary shaft can be made accurately even if the rotary shaft of the object being detected deviates off the center, because the structure is not provided with a magnetic flux shutter disposed vertically to a tip of the rotary shaft, as has been before. In addition, because the non-contact position sensor is not provided with the complicated members such as a magnetic flux shutter of the prior art, it can be mounted easily to the object to be detected, with both of them joined closely together when it is assembled to the rotary shaft of the object.

Accordingly, the non-contact position sensor of this invention can be used widely for such applications as various forms of rotating angle detection, position detection, and the like that require long-term reliability.

Reference numerals
21,41 magnet
22,42,62,65 N-pole
23,43,63,66 S-pole
24,25,44,67 magnetic body
24a, 25a, 44a, 44b tip end
26,45,68 magnetic sensor element
33,53 rotary shaft
34 sector portion
54 I-shaped portion
61 first magnet
64 second magnet
69 intermediate portion
70 reinforcing magnetic body
76 space
111,151 first magnetic body
111a, 120a one-side arm
111b, 120b another-side arm
112,123 intermediate portion
113,141 first magnetic-detecting portion
114 first projecting portion
115,126 space
116 first magnet
117,122 N-pole
118 second magnet
119,121 S-pole
120,152 second magnetic body
124,142 second magnetic-detecting portion
125 second projecting portion
127 magnetic sensor element
133 object
161,162 magnet supporting member
211 first magnetic body
212 sensor element supporting portion
213 projecting portion
214 recessed portion 215 magnetic sensor element
216 first magnet supporting portion
217 second magnet supporting portion
218 first magnet
219 second magnet
220 reinforcing magnetic body
222 aperture
225 object
231 second magnetic body
232 third magnetic body
311 first magnetic body
311a, 320a one-side arm
311b, 320b another side arm
312,323 intermediate portion
313 first magnetic-detecting portion
314 first projecting portion
315,326 recessed portion
316 first magnet
317,322 N-pole
318 second magnet
319,321 S-pole
320 second magnetic body
324 second magnetic detecting portion
325 second projecting portion
327 magnetic sensor element
331 object
332 detective section

What is claimed is:

1. A non-contact position sensor comprising:
a plurality of magnets forming a magnetic circuit so that a continuous magnetic flux flows from one of said magnets, to and through another of said magnets, and back to and through said one of said magnets;
at least one magnetic sensor element within said magnetic circuit; and
an object to be detected, said object positioned in said magnetic circuit in a space between said one and said another of said magnets, said magnetic sensor element remains stationary while said object moves,
said magnetic circuit comprising a U-shaped first magnetic body, a U-shaped second magnetic body, and said one and said another of said plurality of magnets,
said one and said another of said magnets are disposed between said two U-shaped magnetic bodies arranged vertically, and
said magnetic sensor element is held by said two U-shaped magnetic bodies.

2. The non-contact position sensor according to claim 1, wherein said object to be detected has a cross section of any one of a sector shape, semicircular shape and I shape.

3. The non-contact position sensor according to claim 1, wherein
said first magnetic body has a portion having a thickness smaller than another portion of said first magnetic body, and
said magnetic sensor element is disposed to said portion of smaller thickness.

4. The non-contact position sensor according to claim 1, wherein the portion of said first magnetic body where said magnetic sensor element is disposed has a stepped level of different plane from another portion.

5. The non-contact position sensor according to claim 1, wherein the portion of each said U-shaped magnetic bodies where said magnetic sensor element is disposed has a stepped level of different plane from another portion of each of said U-shaped magnetic bodies.

6. The non-contact position sensor according to claim 5, wherein the portions of said U-shaped first and second magnetic bodies where said magnetic sensor element is disposed are in contact to each other via said magnetic sensor element.

7. A non-contact position sensor according to claim 1, wherein said one magnet oriented with reserve polarity relative to said another of said magnets.

8. A non-contact position sensor comprising:
a plurality of magnets forming a magnetic circuit which includes two U-shaped magnetic bodies so that a continuous magnetic flux flows from one of said magnets, to and through another of said magnets, and back to and through said one of said magnets;
at least one magnetic sensor element within said magnetic circuit; and
an object to be detected, said object positioned in said magnetic circuit in a space between said one and said another of said magnets, said magnetic sensor element remains stationary while said object moves;
said magnetic circuit comprising a U-shaped first magnetic body, a U-shaped second magnetic body and the magnets included in said plurality of U-shaped magnetic bodies and disposed between said magnetic bodies
wherein at least one of said two U-shaped magnetic bodies has a shape that at least partially conforms with an external shape of said object to be detected.

9. A non-contact position sensor comprising:
a plurality of magnets forming a magnetic circuit which includes two U-shaped magnetic bodies so that a continuous magnetic flux flows from one of said magnets, to and through another of said magnets, and back to and through said one of said magnets;
at least one magnetic sensor element within said magnetic circuit; and
an object to be detected, said object positioned in said magnetic circuit in a space between said one and said another of said magnets, said magnetic sensor element remains stationary while said object moves, wherein
said magnetic circuit comprising a U-shaped first magnetic body, a U-shaped second magnetic body and the magnets included in said plurality of the U-shaped magnetic bodies and disposed between said magnetic bodies
each of said two U-shaped magnetic bodies has stepped planes, and
said one and said another of said magnets confront each other at different planes.

10. A non-contact position sensor comprising:
a plurality of magnets forming a magnetic circuit which includes two U-shaped magnetic bodies so that a continuous magnetic flux flows from one of said magnets, to and through another of said magnets, and back to and through said one of said magnets;
at least one magnetic sensor element within said magnetic circuit; and
an object to be detected, said object positioned in said magnetic circuit in a space between said one and said another of said magnets, said magnetic sensor element remains stationary while said object moves, wherein
said magnetic circuit comprising a U-shaped first magnetic body, a U-shaped second magnetic body and the magnets included in said plurality of the U-shaped magnetic bodies and disposed between said magnetic bodies each of said two U-shaped magnetic bodies further has a magnet supporting section, and said one and said another of said magnets confront each other at different planes.

11. A non-contact position sensor comprising:

a plurality of magnets forming a magnetic circuit which includes two U-shaped magnetic bodies so that a continuous magnetic flux flows from one of said magnets, to and through another of said magnets, and back to and through said one of said magnets;

at least one magnetic sensor element within said magnetic circuit; and an object to be detected, said object positioned in said magnetic circuit in a space between said two U-shaped magnetic bodies, said magnetic sensor element remains stationary while said object moves, wherein said two magnets are disposed between said U-shaped first and second magnetic bodies arranged vertically, said magnetic sensor element is disposed to a generally center portion between said U-shaped first and second magnetic bodies, an object to be detected, said object positioned in said magnetic circuit in a space between said U-shaped first and second magnetic bodies, said magnetic sensor element remains stationary while said object moves, wherein said object to be detected is disposed in a linearly movable manner between both ends of said U-shaped first magnetic body and both ends of said U-shaped second magnetic body.

12. The non-contact position sensor according to claim 11, wherein one side arm of said U-shaped first magnetic body has a width generally equal to a width of one side arm of said U-shaped second magnetic body, another side arm of said U-shaped first magnetic body has a width generally equal to a width of another side arm of said U-shaped second magnetic body, and a detectable distance of said object to be detected equals to a distance derived by subtracting a length of a detective section of said object from the sum of the width of said one side arm, the width of said another side arm, and a space between said one side arm and said another side arm.

13. The non-contact position sensor according to claim 12, wherein the length of said detective section is longer than any of the width of said one side arm and the width of said another side arm.

14. The non-contact position sensor according to claim 11, wherein a portion of any of said U-shaped first and second magnetic bodies where said magnetic sensor element is disposed has a stepped level of different plane from the other portion of said U-shaped first and second magnetic bodies.

15. The non-contact position sensor according to claim 14, wherein the portions of said U-shaped first and second magnetic bodies where said magnetic sensor element is disposed are in contact to each other via said magnetic sensor element.

* * * * *